United States Patent
Nakagaki

(10) Patent No.: US 6,985,866 B2
(45) Date of Patent: Jan. 10, 2006

(54) SIGNALING COMMUNICATION METHOD OF MOBILE COMMUNICATIONS SYSTEM

(75) Inventor: Tatsuru Nakagaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 702 days.

(21) Appl. No.: 09/968,450

(22) Filed: Oct. 1, 2001

(65) Prior Publication Data
US 2002/0191693 A1    Dec. 19, 2002

(30) Foreign Application Priority Data
Jun. 13, 2001    (JP)    .............................. 2001-178250

(51) Int. Cl.
*G10L 19/14*    (2006.01)
*H04B 7/26*    (2006.01)

(52) U.S. Cl. ...................................... 704/500; 704/221

(58) Field of Classification Search ................ 704/500, 704/221, 230; 370/356; 455/517; 375/240
See application file for complete search history.

(56) References Cited

U.S. PATENT DOCUMENTS

| 6,108,560 A * | 8/2000 | Navaro et al. ............... 455/517 |
| 6,445,696 B1 * | 9/2002 | Foodeei et al. ............. 370/356 |
| 6,754,265 B1 * | 6/2004 | Lindemann ................. 375/240 |
| 2002/0077812 A1 * | 6/2002 | Suzuki et al. ............... 704/230 |
| 2003/0182108 A1 * | 9/2003 | Proctor et al. .............. 704/221 |

FOREIGN PATENT DOCUMENTS

| WO | WO 95/04412 | 2/1995 |
| WO | WO 96/19907 | 6/1996 |

* cited by examiner

*Primary Examiner*—Susan McFadden
(74) *Attorney, Agent, or Firm*—Katten Muchin Rosenman LLP

(57) ABSTRACT

When vocoder-bypass communication is performed between a first mobile station on a voice transmitting side and a second mobile station on a receiving side, the first mobile station transmits voice data the compression rate of which has been reduced periodically. As a result, a vacant space is reserved periodically in a traffic frame transmitted from a base station controller on the receiving side to the second mobile station on the receiving side. When it becomes necessary to transmit signaling data, a signaling multiplexer of the base station controller transmits the signaling data upon multiplexing it into the vacant space of the traffic frame.

14 Claims, 20 Drawing Sheets

S1...S8: SYSTEM IDENTIFIER
C1...C4: CODE TYPE
C5: EMBEDDED TFO MESSAGE INDICATOR BIT
C6...C15: RESERVED.
C16...C18: RATE REDUCTION PARAMETER
C19...C21: RATE REDUCTION PARAMETER.
C22: ERROR CONCEALMENT INDICATOR
　　　CLEARED OTHERWISE.
C23...C89: RESERVED.
D1...D9: PACKET TYPE.

FULL RATE
　D10 - D192　USED

1/2 RATE
　D10 - D92　　USED
　D93 - D192　RESERVED

1/4 RATE
　D10 - D52　　USED
　D53 - D192　RESERVED

1/8 RATE
　D10 - D28　　USED
　D29 - D192　RESERVED

PCM VOICE SIGNAL
(8 BITS)

TFO
(2 BITS)

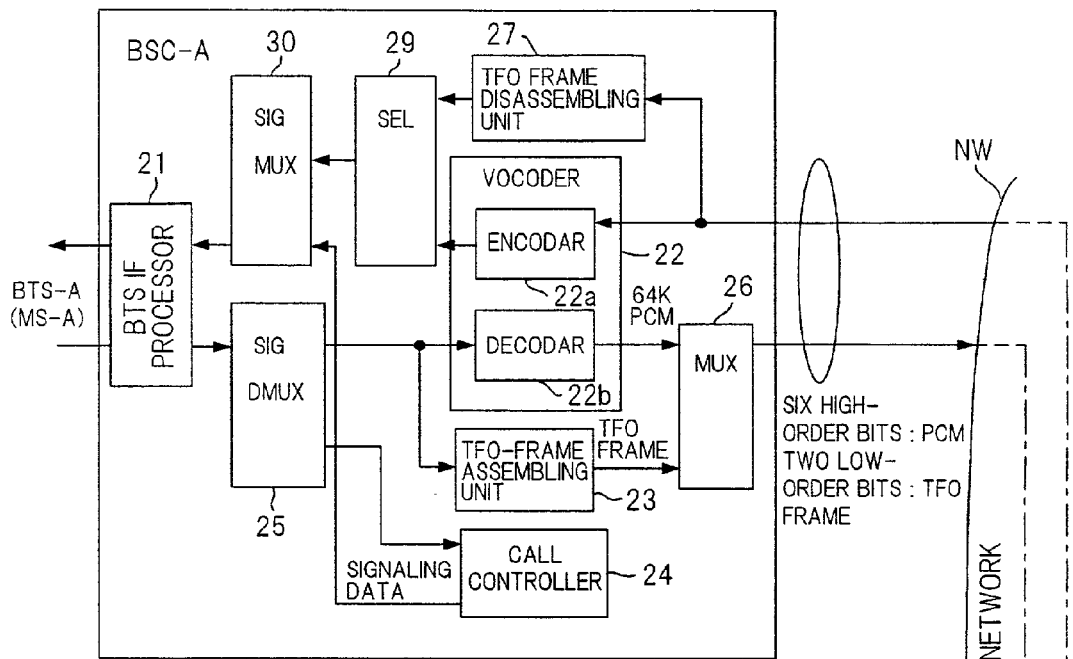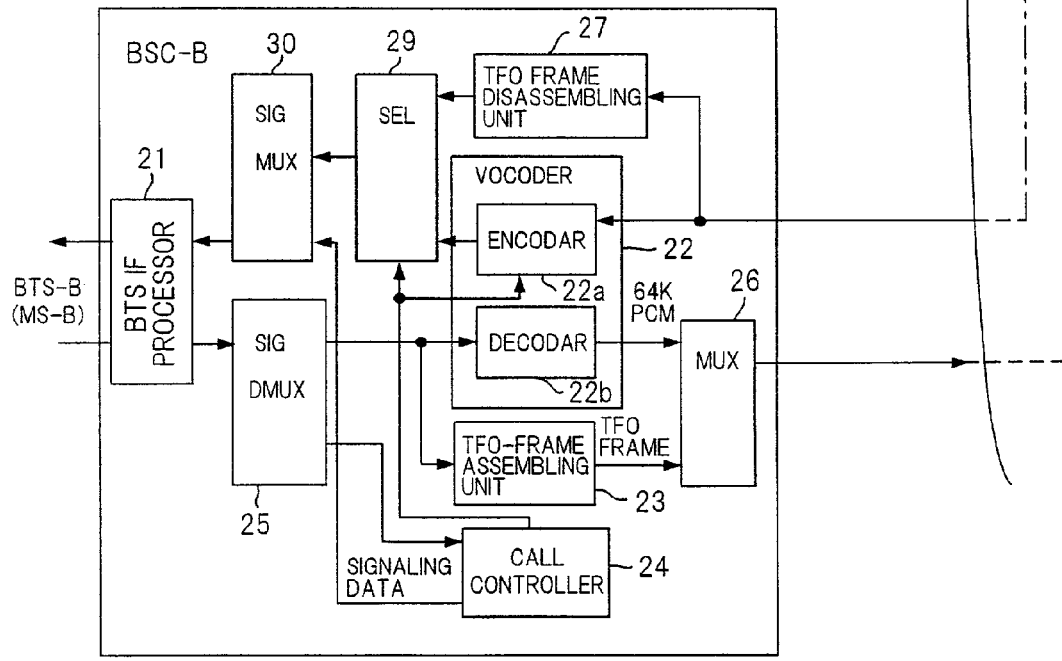
FIG. 9

SIGNALING COMMUNICATION METHOD OF MOBILE COMMUNICATIONS SYSTEM

BACKGROUND OF THE INVENTION

This invention relates to a signaling communication method in a mobile communications system. More particularly, the invention relates to a signaling communication method in a mobile communications system for encoding voice data to compress the amount of data, putting the compressed data into frame form, sending and receiving the frame data between a mobile station and a device on the side of a network, and performing communication by bypassing a vocoder of the network device when mobile stations communicate with each other.

In a mobile wireless communications system, as shown in FIG. 19, a number of base station controllers (BSC) are connected to a communications network NW and a plurality of base station transceiver subsystems (BTS) are connected to each base station controller BSC. Each base station is capable of two-way wireless communication with a mobile station (MS) within a radio zone (cell) centered on the base station. It is so arranged that voice data, which has been compressed by a variable-rate voice codec, and signaling data (data indicating a data handoff command and data indicating a set-up command when a call is originated and terminated, etc.) is multiplexed and transmitted in both directions between the mobile station and the base station controller BSC. To accomplish this, each of mobile stations MS-A, MS-B and each of base station controllers BSC-A, BSC-B are provided with a vocoder (VCD) for encoding voice data at a variable compression rate and restoring encoded compressed data to voice data. Further, each of the base station controllers BSC-A, BSC-B is provided with a call processor CLP and is adapted so as to implement call processing control and handoff control.

In a case where the mobile station MS-A and a stationary station (not shown) connected to the network communicate with each other, the vocoder VCD of the mobile station MS-A encodes voice data to compress the amount of data, places the compressed data in frame form and sends this data to the base station controller BSC-A via a base station transceiver subsystem BTS-A. The vocoder VCD of the base station controller BSC-A restores the encoded compressed data, which has been sent from the mobile station, to 8-bit PCM voice data and sends this data to the communication network NW, whence the data is sent to the stationary station. Further, when PCM voice data from a stationary station enters the base station controller BSC-A from the communication network NW, the vocoder VCD of the base station controller BSC-A encodes the PCM voice data to compress the data, places the compressed data in frame form and transmits this data to the mobile station MS-A via the base station transceiver subsystem BTS-A. The mobile station MS-A restores the input compressed data to the original voice data and outputs this data.

In a case where the mobile stations MS-A and MS-B communicate with each other, the vocoder VCD of the mobile station MS-A on the side of voice transmission encodes voice data to compresses the amount of data, places the compressed data in frame form and sends this data to the base station controller BSC-A via the base station transceiver subsystem BTS-A. The vocoder VCD of the base station controller BSC-A restores the encoded data, which has been sent from the mobile station, to 8-bit PCM voice data and sends this data to the communication network NW. The communication network sends the PCM voice data to the base station controller BSC-B on the receiving side. The vocoder VCD of the base station controller BSC-B encodes the PCM voice data to compress the data, places the compressed data in frame form and transmits this data to the mobile station MS-B via the base station transceiver subsystem BTS-B. The mobile station MS-B restores the input compressed data to the original voice data and outputs the voice data.

At the time of call processing control and at the time of handoff control, etc., it is necessary that the mobile stations MS-A, MS-B and the base station controllers BSC-A, BSC-B send and receive signaling data. The signaling data is transmitted upon being multiplexed into a fixed-length frame that carries the compressed data. In case of 8K CELP, one frame has a length of 172 bits and is transmitted at a period of 20 ms.

In a mobile wireless communications system, voice data and signaling data are transmitted between the mobile stations MS-A, MS-B and the base station controllers BSC-A, BSC-B upon being multiplexed into a fixed-length frame, as mentioned above. Consequently, when it is attempted to transfer signaling data from the base station controllers BSC-A, BSC-B to the mobile stations MS-A, MS-B at the time of handoff, etc., the base station controllers BSC-A, BSC-B lower the compression rate of the voice data from the full rate to less than the half rate, multiplex the signaling data into the space of the half-rate portion left empty by reduction in compression rate, and transfer the multiplexed data. In FIG. 20, (a) indicates an example of a frame in a case where voice data is transferred at the full rate. Here the frame does not contain signaling data. FIG. 20(b) shows an example of a frame obtained by reducing the compression rate to the half rate and multiplexing signaling data into the vacant space. The higher the compression rate, the higher the precision with which the voice data can be restored but the greater the number of encoded bits. On the other hand, the lower the compression rate, the lower the precision with which the voice data can be restored but the smaller the number of encoded bits.

When the mobile station MS-A and mobile station MSB converse with each other in a mobile communications system in which voice is transmitted upon being compressed using a codec in air intervals, the compressed voice data encoded and transmitted from the mobile station MS-A in the manner described above is decoded by the base station controller BSC-A and transmitted to a public switched telephone network (PSTN) as 64-Kbps PCM voice data. This PCM voice data is then encoded again by the base station controller BSC-B on the other end and is decoded again by the mobile station MS-B. As a result, codec processing is executed twice. A problem that arises is a decline in voice quality as compared with communication between a mobile station and a stationary station.

In order to prevent this decline in voice quality, consideration has been given to a system (vocoder bypass system) in which compressed voice data that has been encoded at a mobile station is transferred as is over a PCM line without being subjected to encode/decode processing by the base station controllers BSC-A, BSC-B. FIG. 21 is a diagram useful in describing a vocoder bypass system. When the mobile station MS-A and mobile station MS-B converse with each other, compressed voice data that has been encoded by the vocoder of the mobile station MS-A on the voice transmitting side is sent to the base station controller BSC-B on the other end via the communication network NW as is without being converted to PCM voice data by the vocoder of the base station controller BSC-A. The compressed voice data that has been received from the base station controller BSC-A via the communication network NW is sent to the base station controller BSC-B by being by-passed through the vocoder of the base station controller BSC-B. The same is true when voice is sent from the mobile station MS-B to the mobile station MS-A.

By thus bypassing the vocoders of the base station controllers BSC-A and BSC-B, compressed voice data encoded by the mobile stations MS-A and MS-B is transferred to the opposing mobile station as is and the data is decoded at the opposing mobile station. This means that encode/decoding processing need be executed only one time, resulting in much improved voice quality. In such a vocoder bypass system, however, a restraint is imposed upon the rate when voice is transmitted by the mobile stations MS-A, MS-B, and rate control within the vocoders of the base station controllers BSC-A, BSC-B cannot be carried out. As a consequence, if vocoder bypass is adopted in the conventional mobile communications system that controls the compression rate of the vocoders in the base station controllers BSC-A, BSC-B when signaling data is transmitted, rate control cannot be carried out and signaling data cannot be transmitted.

SUMMARY OF THE INVENTION

Accordingly, an object of the present invention is to make it possible to improve voice quality by vocoder bypass and to transmit signaling data at the time of handoff, etc.

According to a first aspect of the present invention, the foregoing object is attained by transmitting voice data, the compression rate of which has been reduced periodically, from the mobile station MS-A on the voice transmitting side, thereby periodically reserving a space in a traffic frame transmitted from a network device on the receiving side (e.g., the base station controller BSC-B on the receiving side) to the mobile station MS-B on the receiving side. When it becomes necessary to transmit signaling data, the latter is transmitted by being multiplexed into the space of the traffic frame.

According to a second aspect of the present invention, the foregoing object is attained by suspending vocoder bypass temporarily only when transmission of signaling data becomes necessary, and transmitting PCM voice data, which has been restored by a vocoder of a network device on the transmitting side (e.g., the base station controller BSC-A on the transmitting side), to a network device on the receiving side (e.g., the base station controller BSC-B on the receiving side). The vocoder of the base station controller BSC-B on the receiving side encodes the PCM voice data at a compression rate that is less than half the full rate, thereby reserving a space for multiplexing signaling data into a traffic frame, and transmits the signaling data by multiplexing it into this space.

A TFO (Tandem-Free Operation) technique (3GPP2A.S0004-0) has been proposed for the purpose of implementing vocoder bypass. In the TFO technique, the two low-order bits of the eight bits constituting the PCM voice data are used for vocoder-bypass communication, i.e., for the transmission of compressed data. According to a third aspect of the present invention, therefore, the foregoing object is attained by using two bits of the eight bits of a PCM line between network devices (e.g., the base station controllers BSC-A and BSC-B) for vocoder bypass, and using the remaining six bits to transmit PCM voice data that has been obtained by decoding performed by the vocoder of the base station controller BSC-A on the transmitting side. The base station controller BSC-B on the receiving side (1) implements vocoder bypass using TFO frame data of two low-order bits during vocoder-bypass communication; and (2) when transmission of signaling data becomes necessary, encodes the 6-bit PCM voice data at a compression rate that is less than half the full rate, thereby reserving a space for multiplexing signaling data into a traffic frame, and transmits the signaling data by multiplexing it into this space.

According to a fourth aspect of the present invention, the foregoing object is attained by having a network device on the receiving side (e.g., the base station controller BSC-B on the receiving side) discard one frame of vocoder-bypassed data when transmission of signaling data becomes necessary, and transmitting signaling data using fully the one frame's worth of area left vacant. In a case where the signaling data is so large in quantity that all of the signaling data cannot be transmitted in only one frame's worth of space, one frame of bypass data is discarded again following a certain interval and the remaining signaling data is transmitted. The reason for leaving an intervening interval is that voice quality would decline markedly if consecutive frames were discarded. Conversely, voice quality is not affected that much if only one frame is discarded alone.

According to a fifth aspect of the present invention, the foregoing object is attained by accumulating signaling data in a buffer if transmission of the signaling data becomes necessary and waiting for the compression rate of vocoder-bypassed voice data to become less than half the full rate. When a frame of less than half the full compression rate is received, a space is produced in a traffic frame and, as a result, the signaling data is transmitted upon being multiplexed. In case of a variable-rate voice codec, encoding is performed upon lowering the voice compression rate to one-eighth, etc., when there is little change in the input voice, which is the case in silent intervals. If the system is waiting, therefore, a frame having a low compression rate will be received and transmission of the signaling data will be completed. If there is no frame whose compression rate is less than half the full rate, there will be instances where the time needed to complete the transmission of the signaling data is prolonged. Accordingly, if transmission is not completed upon elapse of a fixed period of time, the signaling data is transmitted in accordance with the method of the second, third or fourth aspect of the invention.

Other features and advantages of the present invention will be apparent from the following description in conjunction with the accompanying drawings.

BRIEF DESCRIPTION OF THE DRAWINGS

FIG. 9 is a block diagram illustrating the configuration of a mobile wireless communications system according to a third embodiment of the present invention;

DESCRIPTION OF THE PREFERRED EMBODIMENTS (A) First Embodiment

Figure 1:
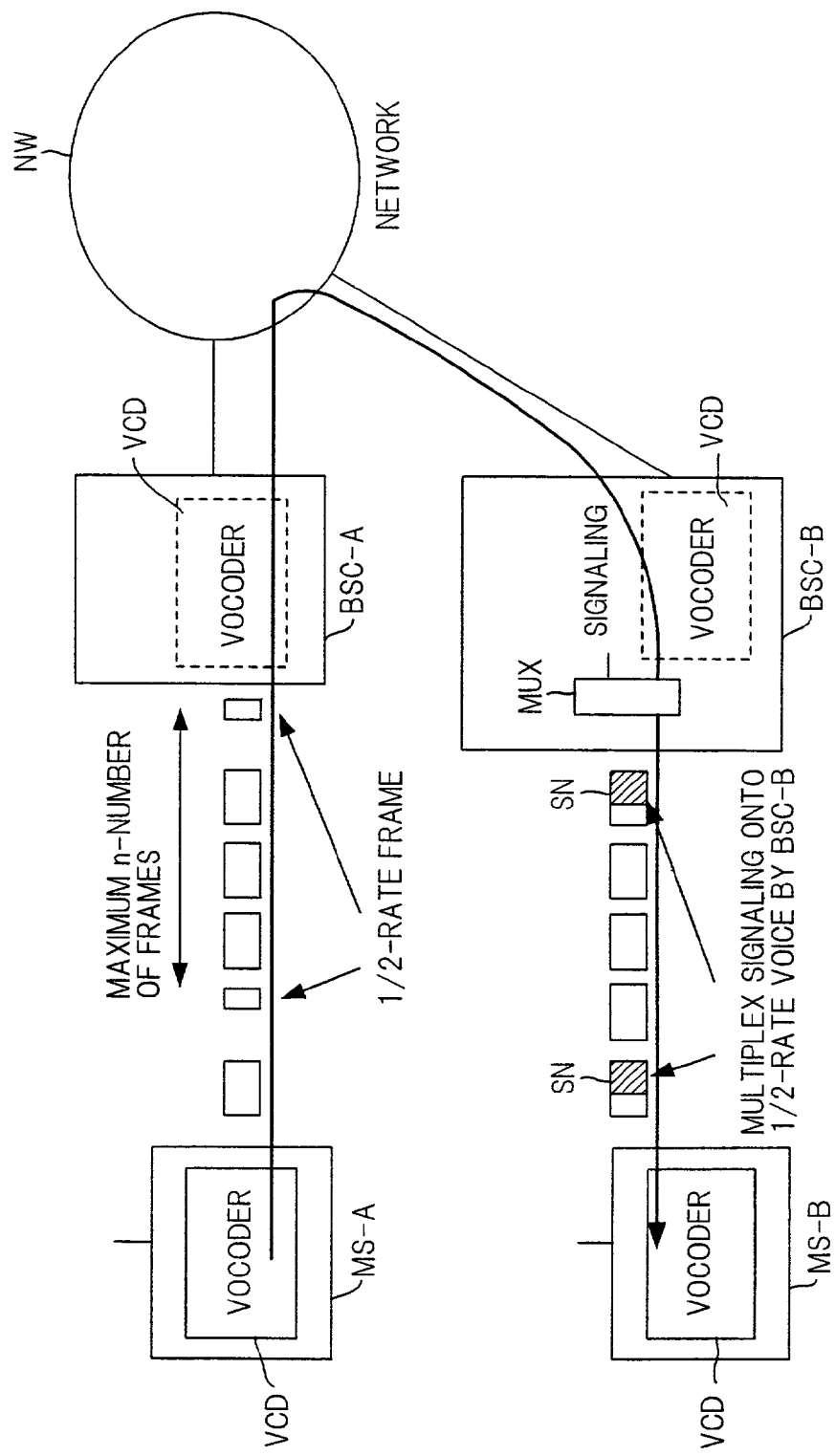
FIG. 1 is a diagram useful in describing an overview of a first embodiment of the present invention.

FIG. 1 is a diagram useful in describing an overview of a first embodiment. Shown in FIG. 1 are communication network NW, such as a public switched telephone network, base station controllers BSC-A, BSC-B, mobile stations MS-A, MS-B, vocoders VCD provided in the mobile stations and base station controllers, and a signaling multiplexer MUX for multiplexing signaling data onto voice data. The base station transceiver subsystems BTS-A, BTS-B are not shown.

The vocoder VCD of the mobile station MS-A on the voice transmitting side encodes voice data upon lowering the compression rate thereof to one-half the full rate periodically, e.g., every N frame, and transmits the encoded voice data to the base station controller BSC-A. The latter transmits the compressed data, which enters from the mobile station MS-A, to the base station controller BSC-B on the receiving side via the communication network NW while bypassing the vocoder. As a result, the base station controller BSC-B on the receiving side periodically reserves a space for multiplexing signaling data in a traffic stream for transmitting the voice data to the mobile station MS-B on the receiving side. When it becomes necessary to transmit the signaling data, the base station controller BSC-B transmits the signaling data by multiplexing it into the space in the traffic frame.

Figure 2:
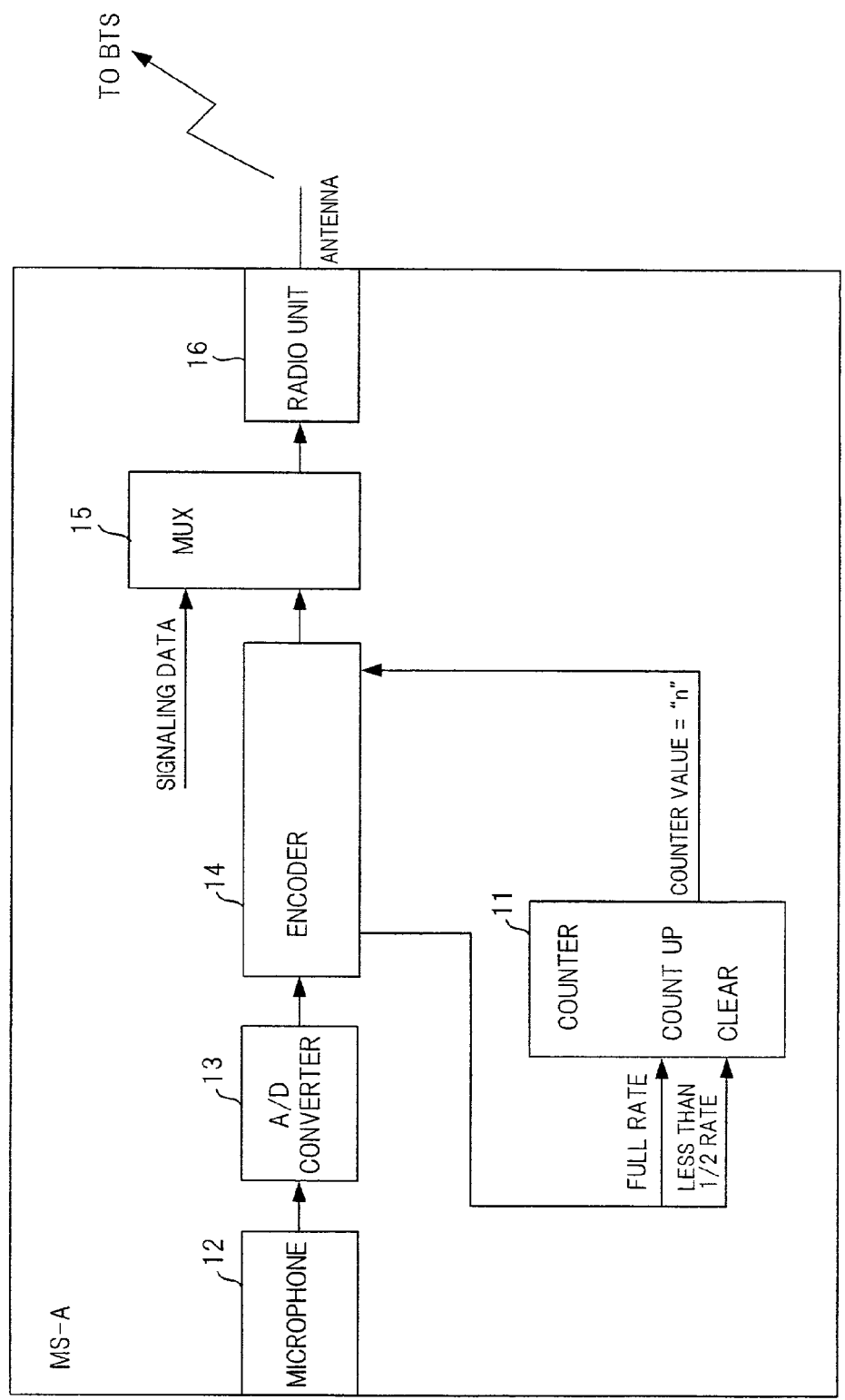
FIG. 2 is a block diagram of voice processing in the upstream direction of a mobile station according to the first embodiment.

FIG. 2 is a block diagram of voice processing in the upstream direction of the mobile station MS-A.

Compressed voice data that has been encoded by the mobile station MS-A bypasses the vocoder VCD of the base station controller BSC-A and is transmitted to the base station controller BSC-B on the receiving side as is. Here also the data bypasses the vocoder and is transmitted to the mobile station MS-B.

As shown in FIG. 2, the mobile station MS-A has a counter 11 for controlling transmission rate. Voice that has entered from a microphone 12 is converted to a 64K digital signal (PCM voice data) by an A/D converter 13 and the digital signal is transmitted to an encoder 14 constituting a vocoder. In the absence of an externally applied control signal, the encoder 14 performs encoding at an optimum rate in conformity with the input data. For example, the compression rate is reduced if there is little change in the voice signal, as when the input voice continues to remain in the silent state. The encoder 14 notifies the counter 11 of the compression rate when encoding has been carried out.

If the compression rate of which the counter 11 has been notified is the full rate, then the counter 11 is counted up. If the compression rate is less than half the full rate, the value in the counter 11 is cleared. If encoding at the full rate subsequently continues and the value in the counter becomes n, the counter 11 so notifies the encoder 14. In response to being so notified, the encoder 14 transmits the next transmission frame of voice data upon forcibly reducing the compression rate thereof to half the full rate. As a result, a frame whose rate is less than half the full rate is output one time into n frames at minimum from the encoder 14 of the mobile station MS-A.

The fixed-length frame output from the encoder 14 is multiplexed with signaling data when necessary by a multiplexer 15, and the resulting signal is transmitted as a radio signal to the base station transceiver subsystem BTS-B on the receiving side via a radio unit 16.

The frame thus transmitted from the mobile station MS-A bypasses the vocoder VCD of the base station controller BSC-A (see FIG. 1) on the transmitting side and is transmitted to the base station controller BSC-B on the receiving side as is. In a case where signaling data is to be transmitted to the mobile station MS-B, a traffic frame whose rate is less than half the full rate will arrive from the base station controller BSC-A if the base station controller BSC-B on the receiving side waits for n frames at minimum. The base station controller BSC-B therefore waits for this traffic frame, multiplexes the signaling data into the vacant portion of this frame and then transmits the traffic frame to the mobile station MS-B.

Figure 3:
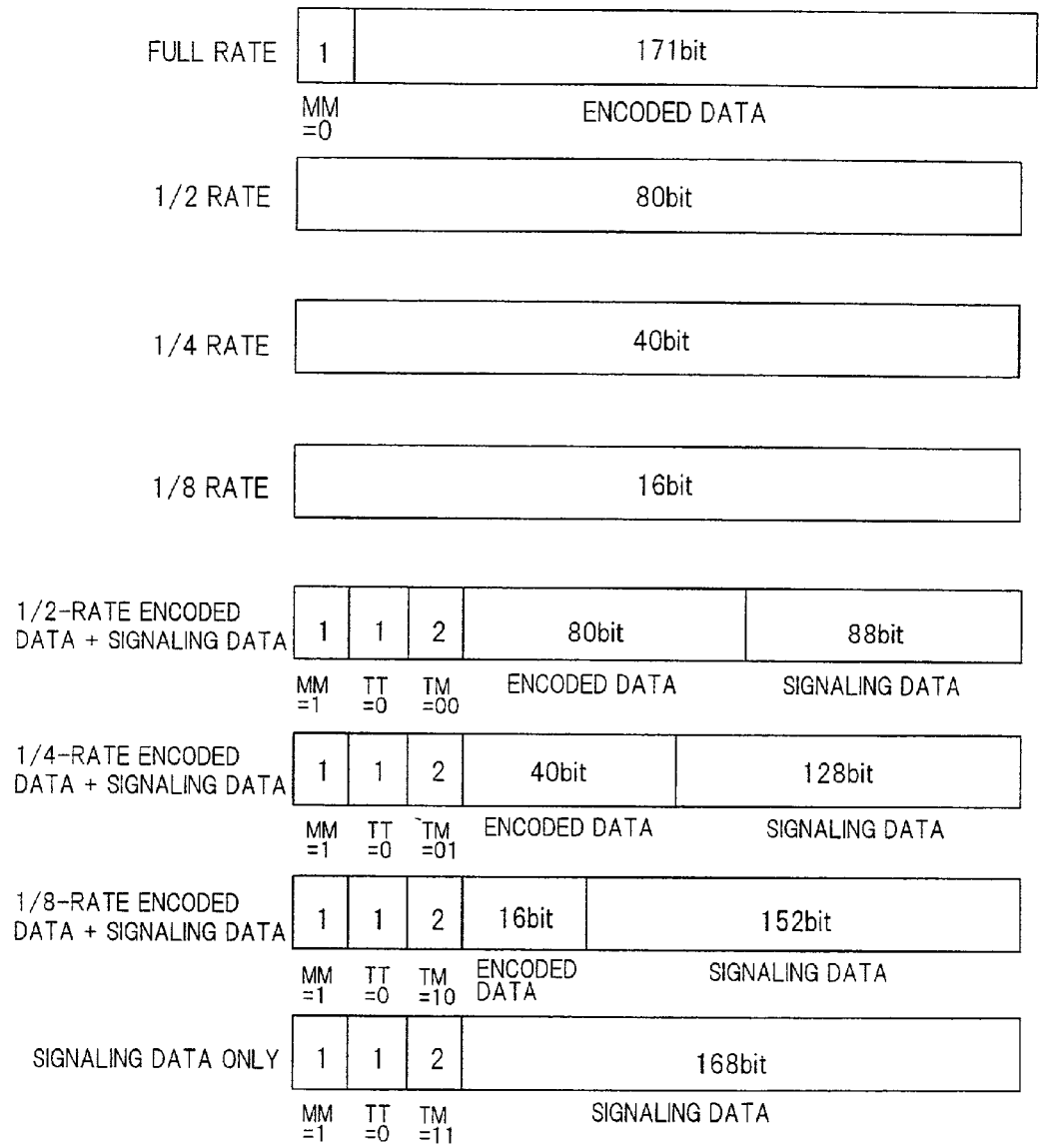
FIG. 3 is a diagram showing the structure of a traffic frame sent and received between a mobile station and a base station controller.

FIG. 3 is a diagram showing the structure of a traffic frame sent and received between a mobile station and a base station controller. In case of 8K CELP, one frame has a length of 172 bits and is transmitted at period of 20 ms. The first bit at the head of the frame indicates the Mixed Mode (MM mode); a 0 indicates that the frame contains only encoded data (compressed voice data), and a 1 that the frame contains a mixture of encoded data and signaling data. The second bit indicates the Traffic Type Mode (TT mode); a 0 indicates that signaling data has been multiplexed into the frame, and a 1 that secondary traffic has been multiplexed into the frame. The third and fourth bits indicate the Traffic Mode (TM); 00, 01, 10 and 11 indicate that the encoded data/ signaling data is 80/88 bits, 10/128 bits, 16/152 bits and 0/168 bits, respectively.

If two items of 80-bit encoded data are inserted redundantly into a frame of encoded data whose compression rate is half the full rate and signaling data is transmitted, 80-bit encoded data and 88-bit signaling data will be multiplexed. The same is true also for frames whose compression rate is one-fourth and one-eighth the full rate.

Figure 4:
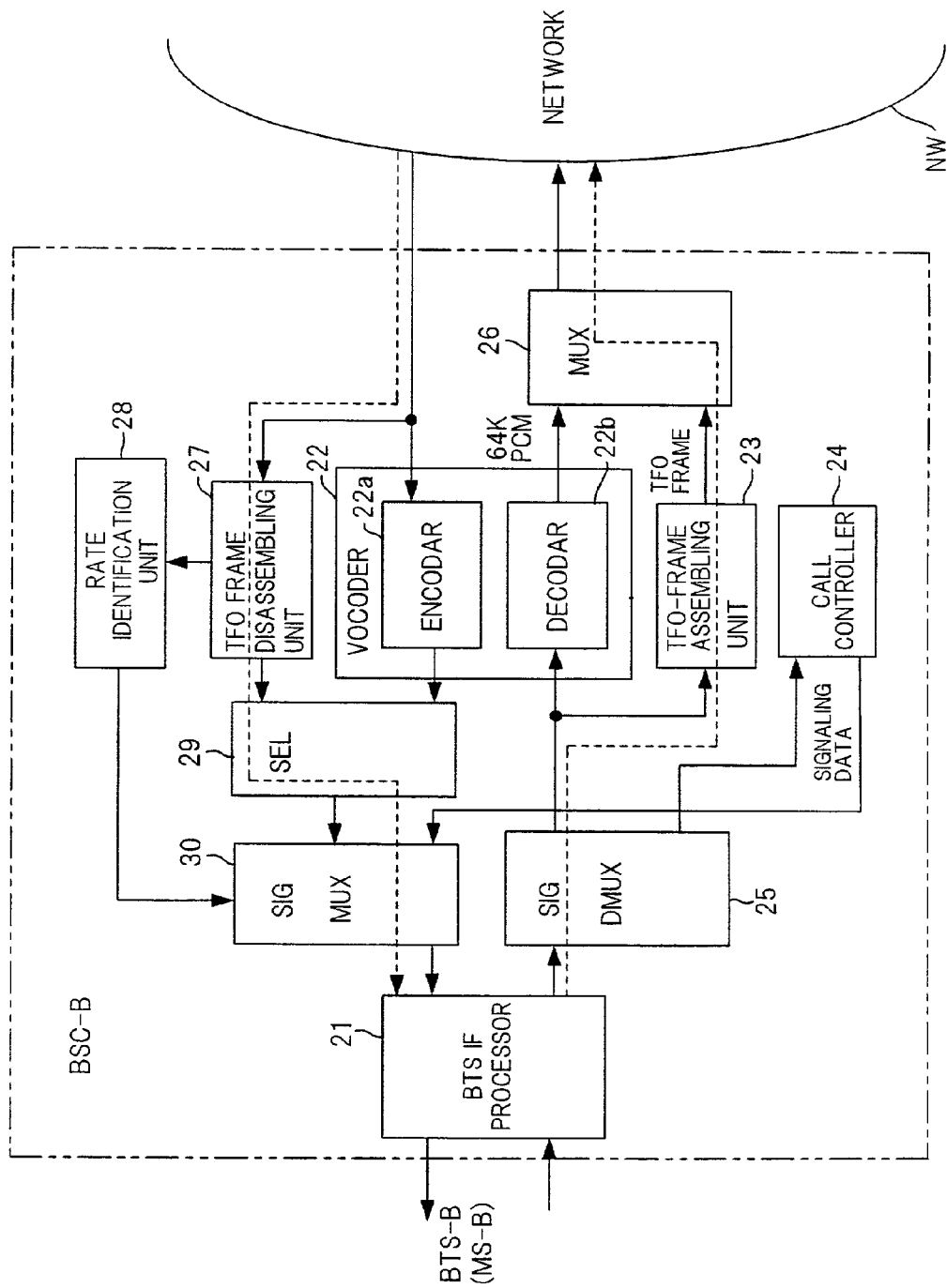
FIG. 4 is a diagram showing the structure of a base station controller in the first embodiment for a case where vocoder bypass is implemented using the TFO technique.

FIG. 4 is a diagram showing the structure of the base station controller BSC-B in the first embodiment for a case where vocoder bypass is implemented using the TFO technique. The base station controller BSC-A also has the same structure. As shown in FIG. 4, the base station controller BSC-B includes a BTS IF processor 21 for administering processing to interface the base station transceiver subsystem BTS-B, and a vocoder 22 for restoring compressed data that enters from a mobile station to PCM voice data and outputting the PCM voice data, and for encoding PCM voice data that enters from the network and outputting the encoded data. The vocoder 22 has an encoder 22a and a decoder 22b.

Figure 5:
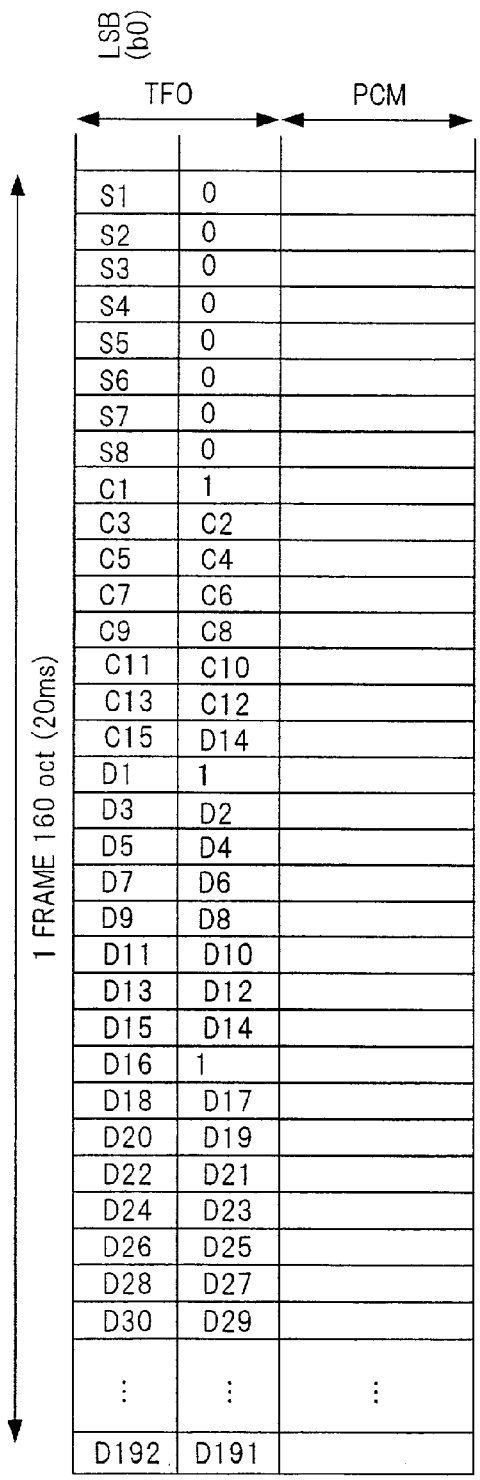
FIG. 5 is a diagram showing the structure of a TFO frame.

The base station controller BSC-B further includes a TFO-frame assembling unit 23 for assembling a TFO frame using the compressed voice data. As shown in FIG. 5, the TFO frame is created by mapping TFO frame data to two low-order bits of 8-bit PCM voice data. The length of one TFO frame is 160 octets (20 ms) and is constituted by 2×160 bits. In the TFO frame data, data bits D1 to D9 indicate rate identification information (packet type), whether the rate is the full rate, half rate, one-fourth rate or one-eighth rate. In the case of the full rate, all of data bits D10 to D192 are used to express the encoded data. In the case of the half rate, data bits D10 to D92 are used and the remaining data bits D93 to D192 are not used. In the case of the one-fourth rate, data bits D10 to D52 are used and the remaining data bits D53 to D192 are not used. In the case of the one-eighth rate, data bits D10 to D28 are used and the remaining data bits D29 to D192 are not used. In other words, as the compression rate declines, the amount of data to be transmitted decreases, thereby allowing signaling data to be multiplexed.

The base station controller BSC-B further includes a call controller 24 for exercising call processing control and handoff control, etc., and a signaling-data demultiplexer 25 demultiplexes compressed voice data and signaling data from a traffic frame that enters from the mobile station MS-B via the base station transceiver subsystem BTS-B, inputs the compressed voice data to the decoder 22b of the vocoder 22 and to the TFO-frame assembling unit 23, and inputs the signaling data to the call controller 24. A multiplexer 26 (1) selects, and sends to the network, the TFO frame that has been assembled by the TFO-frame assembling unit 23 when mobile stations communicate with each other (perform vocoder-bypass communication), and (2) selects, and sends to the network, 8-bit PCM voice data that has been restored by the decoder 22b of the vocoder 22 when a mobile station and a stationary station communicate with each other.

The base station controller BSC-B further includes a TFO frame disassembling unit 27 for disassembling PCM voice data that enters from the network, collecting the two low-order bit TFO frame data thereof to create compressed data and outputting the compressed data; a rate identification unit 28 for identifying the compression rate by referring to the rate identification information (D1 to D9) of the TFO frame data; and a selector 29. The latter (1) selects compressed data, which has been created by the TFO frame disassembling unit 27, when mobile stations communicate with each other (i.e., perform vocoder-bypass communication), and (2) selects compressed data, which has been encoded by the encoder 22a of vocoder 22, when a mobile station and a stationary station communicate with each other. The base station controller BSC-B further includes a signaling data multiplexer 30. (1) When signaling data to be sent to a mobile station from the call controller 24 exists and, moreover, the compression rate of voice data received by a TFO frame is less than half the full rate, the signaling data multiplexer 30 multiplexes the signaling data onto the compressed data output from the selector 29 and sends the multiplexed data to the side of a mobile station. (2) At other times, the signaling data multiplexer 30 selects only the compressed data output from the selector 29 and sends this data to the side of the mobile station.

In communication between mobile stations (vocoder-bypass communication), the base station controller BSC-A on the transmitting side assembles a TFO frame in the TFO-frame assembling unit 23 using compressed voice data that enters from the mobile station MS-A via the base station transceiver subsystem BTS-A, and transmits the TFO frame to the base station controller BSC-B on the receiving side via the network. The base station controller BSC-B on the receiving side disassembles the TFO frame data in the TFO frame disassembling unit 27 and transmits the compressed data obtained to the side of the mobile station.

If, when signaling data to be transmitted from the call controller 24 to a mobile station is produced under these conditions, the rate identification unit 28 monitoring whether the compression rate has fallen to less than half the full rate determines that this has occurred, then the rate identification unit 28 so notifies the signaling data multiplexer 30. In response to a decline in the compression rate to less than half the full rate, a vacant space is produced in a traffic frame. As a result, the signaling data multiplexer 30 multiplexes the signaling data, which enters from the call controller 24, into the vacant space and transmits the data to the mobile station.

Though the foregoing relates to a case where the base station controller BSC is provided with a vocoder, the base station transceiver subsystem BTS also can be provided with a vocoder. The same is true for the embodiment that follows.

(B) Second Embodiment

When it becomes necessary to transmit signaling data to the mobile station MS-B on the receiving side from the base station controller BSC-B on the receiving side during vocoder-bypass communication, the second embodiment is such that (1) the base station controller BSC-B on the receiving side requests the base station controller BSC-A on the transmitting side to halt vocoder-bypass communication and to instead transmit PCM voice data that is output from the vocoder; (2) the base station controller BSC-A on the transmitting side responds to this request by transmitting the PCM voice data output from the vocoder; (3) the vocoder of the base station controller BSC-B on the receiving side encodes the PCM voice data, which has been received from the base station controller on the transmitting side, upon reducing the compression rate thereof; and (4) transmits the signaling data upon multiplexing it into the vacant space of a traffic frame that transports the compressed data obtained by encoding.

Figure 6:
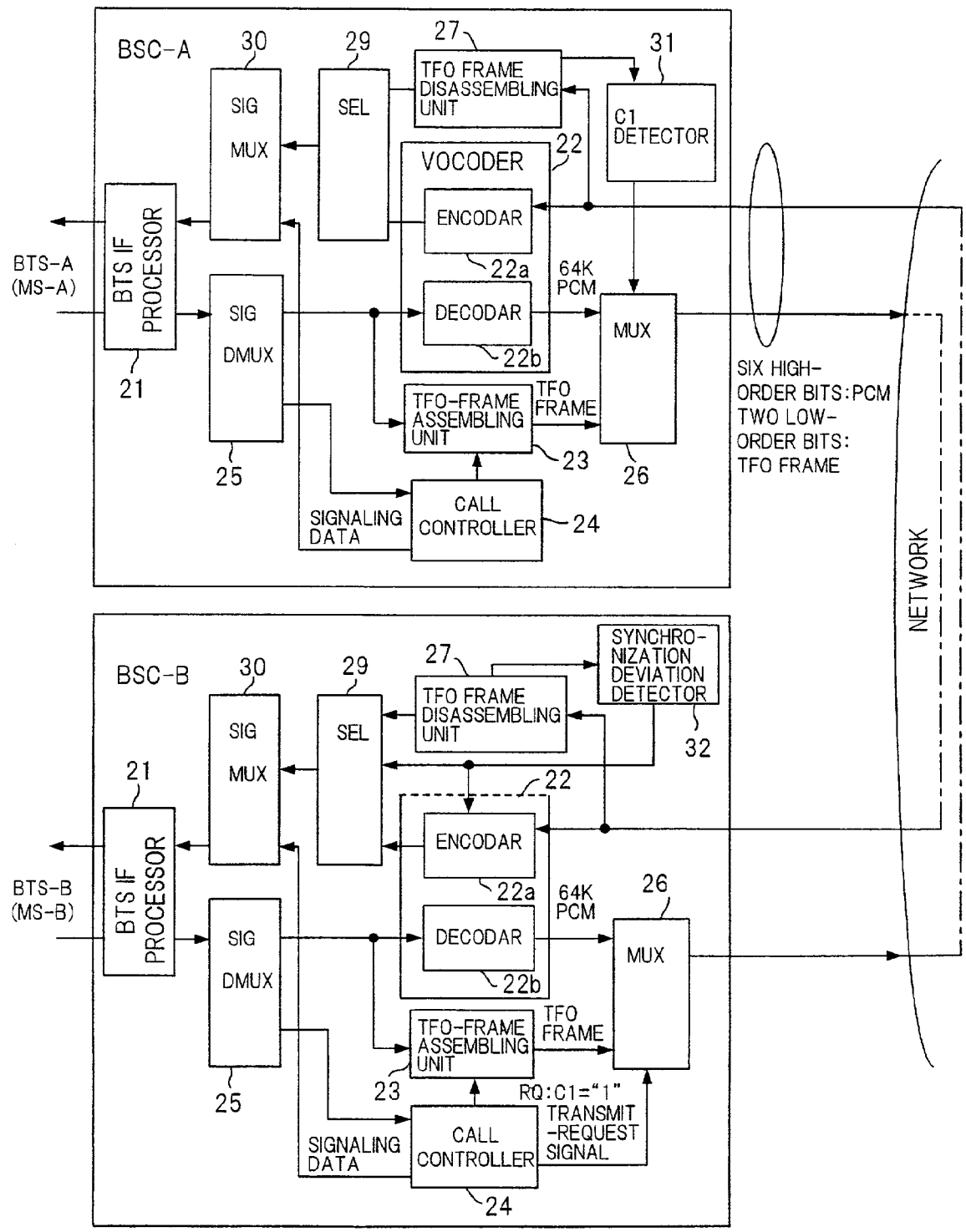
FIG. 6 is a block diagram illustrating the configuration of a mobile wireless communications system according to a second embodiment of the present invention.

FIG. 6 is a block diagram illustrating the configuration of a mobile wireless communications system according to the second embodiment. Here two base station controllers BSC-A and BSC-B are illustrated. FIG. 6 illustrates an arrangement for a case in which voice data is transmitted from the base station controller BSC-A to the base station controller BSC-B. Though the base station controllers BSC-A, BSC-B are shown to have different structures, in actuality the base station controllers BSC-A, BSC-B are identically constructed. Further, components in the base station controllers BSC-A, BSC-B identical with those of the base station controller of the first embodiment shown in FIG. 4 are designated by like reference characters.

The base station controller BSC-B on the receiving side differs from that of the first embodiment in FIG. 4 in the following respects:

(1) When it becomes necessary to transmit signaling data, the call controller 24 requests the TFO-frame assembling unit 23 to transmit a TFO frame for which the C1 bit is "1" to the base station controller BSC-A on the transmitting side and instructs the multiplexer 26 to select the output of the TFO-frame assembling unit 23.

(2) There is provided a TFO-frame synchronization deviation detector 32 for detecting, by TFO-frame synchronization deviation, the fact that 8-bit PCM voice data has been transmitted from the base station controller BSC-A on the transmitting side.

(3) In response to detection of TFO-frame synchronization deviation, the encoder 22a of the vocoder 22 compresses and encodes the PCM voice data, which is sent from the base station controller BSC-A, at half the full rate.

(4) The selector 29 selects the output of the encoder 22a in response to detection of TFO-frame synchronization deviation.

(5) The signaling data multiplexer 30 sends signaling data by multiplexing it onto the half-rate compressed voice data.

Further, the base station controller BSC-A on the transmitting side differs in the following respects:

(1) There is provided a C1 detector 31 for detecting that the C1 bit of the TFO frame sent from the base station controller BSC-B on the receiving side is "1".

(2) When C1="1" is detected, the C1 detector 31 controls the multiplexer 26 so that full-rate PCM voice data output from the decoder 22b of vocoder 22 is selected and output.

Figure 7:
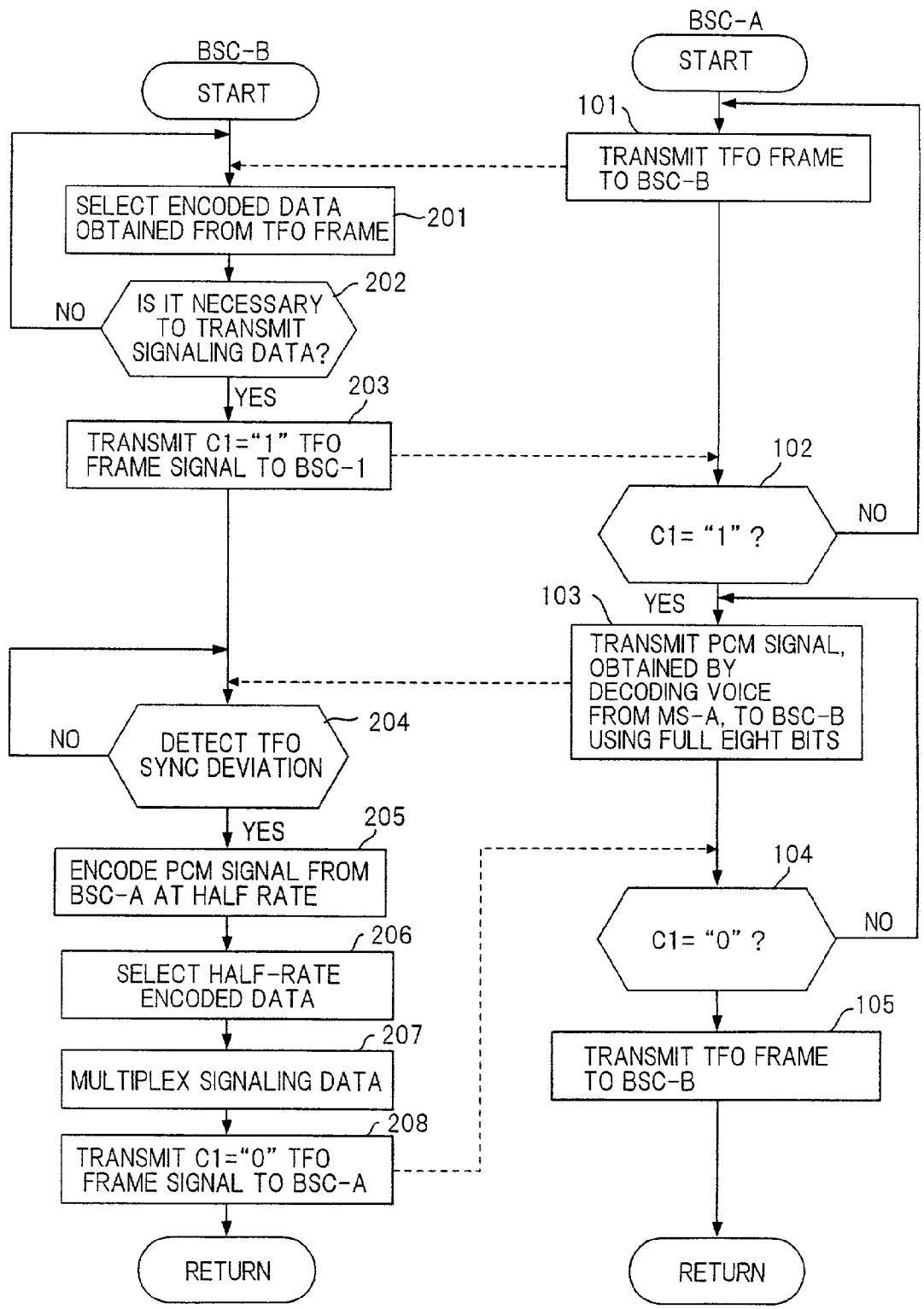
FIG. 7 is a flowchart of control processing according to the second embodiment.

FIG. 7 is a flowchart of control processing according to the second embodiment.

Compressed data that has been encoded by the vocoder of the mobile station MS-A is decoded by the decoder 22b of the base station controller BSC-A on the transmitting side so as to be restored to 8-bit PCM voice data. Concurrently, the compressed data that has been encoded by the vocoder of the mobile station MS-A is input to the TFO-frame assembling unit 23 as is so that TFO frame data is created. When vocoder-bypass communication is carried out, the multiplexer 26 writes the TFO frame data, which is output from the TFO-frame assembling unit 23, over the two low-order bits of the 8-bit PCM voice data that has been decoded by the decoder 22b and transmits the TFO frame to the base station controller BSC-B on the receiving side (step 101). In other words, the six high-order bits of the 8-bit PCM voice data represent voice data and the two low-order bits represent TFO frame data. The base station controller BSC-A on the transmitting side thenceforth continues executing the vocoder-bypass communication processing of step 101 until TFO frame data for which C1= "1" holds is received from the base station controller BSC-B on the receiving side (step 102).

On the other hand, the base station controller BSC-B on the receiving side receives data from the base station controller BSC-A, full 8-bit encode processing is executed by the encoder 22a and the TFO frame disassembling unit 27 extracts the two low-order bits of the PCM voice data and extracts compressed voice data that has been bypassed. At the time of vocoder bypass, the selector 29 selects the compressed data output from the TFO frame disassembling unit 27 and sends this data to the mobile station MS-B via the base station transceiver subsystem BTS-B (step 201). Next, it is determined whether it has become necessary to transmit signaling data (step 202). If transmission of signaling data is not necessary, then the processing of step 201 is repeated.

If it becomes necessary for the base station controller BSC-B to transmit signaling data to the mobile station MS-B under these circumstances, the call controller 24 instructs the TFO-frame assembling unit 23 to transmit a TFO frame for which the C1 bit is "1" to the base station controller BSC-A on the transmitting side. In response, the TFO-frame assembling unit 23 sets C1 to "1" and the multiplexer 26 transmits the TFO frame data to the base station controller BSC-A on the transmitting side (step 203). If there is no request to transmit signaling data, then C1 is made "0" and the TFO frame is transmitted. It should be noted that with the conventional TFO scheme, the four bits C1 to C4 are used to report the codec type. In the present embodiment, however, the codec type is reported using the three bits C2 to C4.

After transmission of the TFO frame for which C1 is "1", the base station controller BSC-B on the receiving side waits for 8-bit PCM voice data to be transmitted from the base station controller BSC-A on the transmitting side. That is, the base station controller BSC-A waits for synchronization of the TFO frame to deviate (step 204). Meanwhile, if the base station controller BSC-A on the transmitting side receives the TFO frame for which C1 is "1", the C1 detector 31 detects that C1 is "1" and controls the multiplexer 26 to select and output only the PCM voice data output from the decoder 22b. That is, the PCM voice data from the mobile station MS-A is transmitted to the base station controller BSC-B on the receiving side using the full eight bits (step 103). It is subsequently detected whether C="0" holds (step 104). The processing of step 103 is continued until C1="0" is found to hold.

The TFO-frame synchronization deviation detector 32 of the base station controller BSC-B on the receiving side detects TFO-frame synchronization deviation in response to halting of the transmission of the TFO frame from the base station controller BSC-A on the transmitting side (step 204). If TFO-frame synchronization deviation is detected, i.e., if 8-bit PCM voice data is received, the encoder 22a of vocoder 22 encodes the received PCM voice data at a compression rate that is less than half the full rate (step 205) and the selector 29 changes over from the compressed data output by the TFO frame disassembling unit 27 to the half-rate compressed data output by the encoder 22a (step 206) The signaling data multiplexer 30 multiplexes the signaling data that enters from the call controller 24 to the half-rate vacant space of a traffic frame and transmits the multiplexed data to the mobile station MS-B (step 207). If transmission of all of the signaling data is completed, the call controller 24 of the base station controller BSC-B on the receiving side restores to "0" the C1 bit of the TFO frame transmitted to the base station controller BSC-A on the transmitting side (step 208).

In response to C1="0", the base station controller BSC-A on the transmitting side resumes vocoder-bypass communication. That is, the C1 detector 31 detects that C1="0" holds and instructs the multiplexer 26 to resume vocoder-bypass communication. In response, the multiplexer 26 writes the TFO frame data, which is output from the TFO-frame assembling unit 23, over the two low-order bits of the 8-bit PCM voice data that has been decoded by the decoder 22b and transmits the TFO frame to the base station controller BSC-B on the receiving side (step 105). Control then returns to the beginning and processing from this point onward is repeated.

(C) Third Embodiment

Figure 8A:
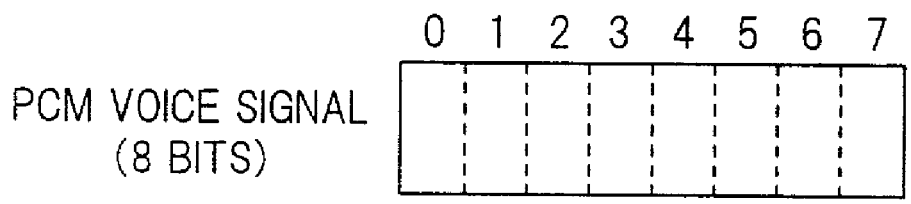
FIGS. 8A, 8B and 8C show an example in which TFO frame data is mapped to two low-order bits of PCM voice data.
Figure 8B:
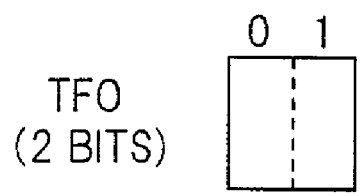
Figure 8C:
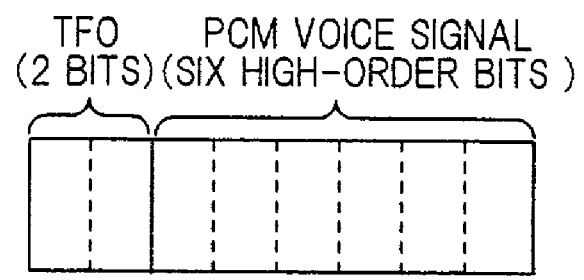

In a third embodiment, (1) the base station controller BSC-A on the transmitting side restores compressed data that enters from the mobile station MS-A to n-bit (n=8) PCM voice data (FIG. 8A). (2) The base station controller BSC-A assembles a TFO frame using this compressed data, delimits the TFO frame data two bits at a time (FIG. 8B), maps the 2-bit TFO frame data to the two low-order bits of the 8-bit PCM voice data (FIG. 8C) and transmits the result to the opposing base station controller. (1) The base station controller BSC-B on the receiving side sends the mobile station MSB compressed data, which is obtained from the TFO frame data that has been mapped to the PCM voice data input from the network, during vocoder-bypass communication. (2) When it becomes necessary to transmit signaling data to a mobile station, the base station controller BSC-B on the receiving side encodes the 6-bit high-order data, to which the TFO frame data has not been mapped, at a compression rate lower than the full rate, e.g., at the half rate, multiplexes the signaling data into the traffic frame that carries the compressed data obtained, and transmits the multiplexed signal.

FIG. 9 is a block diagram illustrating the configuration of a mobile wireless communications system according to the third embodiment. Here two base station controllers BSC-A and BSC-B are illustrated. FIG. 9 illustrates an arrangement for a case in which voice data is transmitted from the base station controller BSC-A to the base station controller BSC-B. Though the base station controllers BSC-A, BSC-B are shown to have slightly different structures, in actuality the base station controllers BSC-A, BSC-B are identically constructed. Further, components in the base station controllers BSC-A, BSC-B identical with those of the base station controller of the first embodiment shown in FIG. 4 are designated by like reference characters.

The base station controller BSC-A on the transmitting side differs from that of the first embodiment in FIG. 4 in that the multiplexer 26 always writes TFO frame data, which is output from the TFO-frame assembling unit 23, over the two low-order bits of the 8-bit PCM voice data decoded by the decoder 22b and transmits the resulting data to the base station controller BSC-B on the receiving side.

Further, the base station controller BSC-B on the receiving side differs in the following respects: When signaling data transmitted to the mobile station MS-B is produced, (1) the call controller 24 instructs the encoder 22a to perform encoding at the half rate using the six high-order bits of the PCM data; (2) the selector 29 is caused to select and output the compressed data obtained from the encoder 22a; and (3) the signaling data multiplexer 30 transmits the signaling data by multiplexing it into the half-rate space created in a traffic frame.

Figure 10:
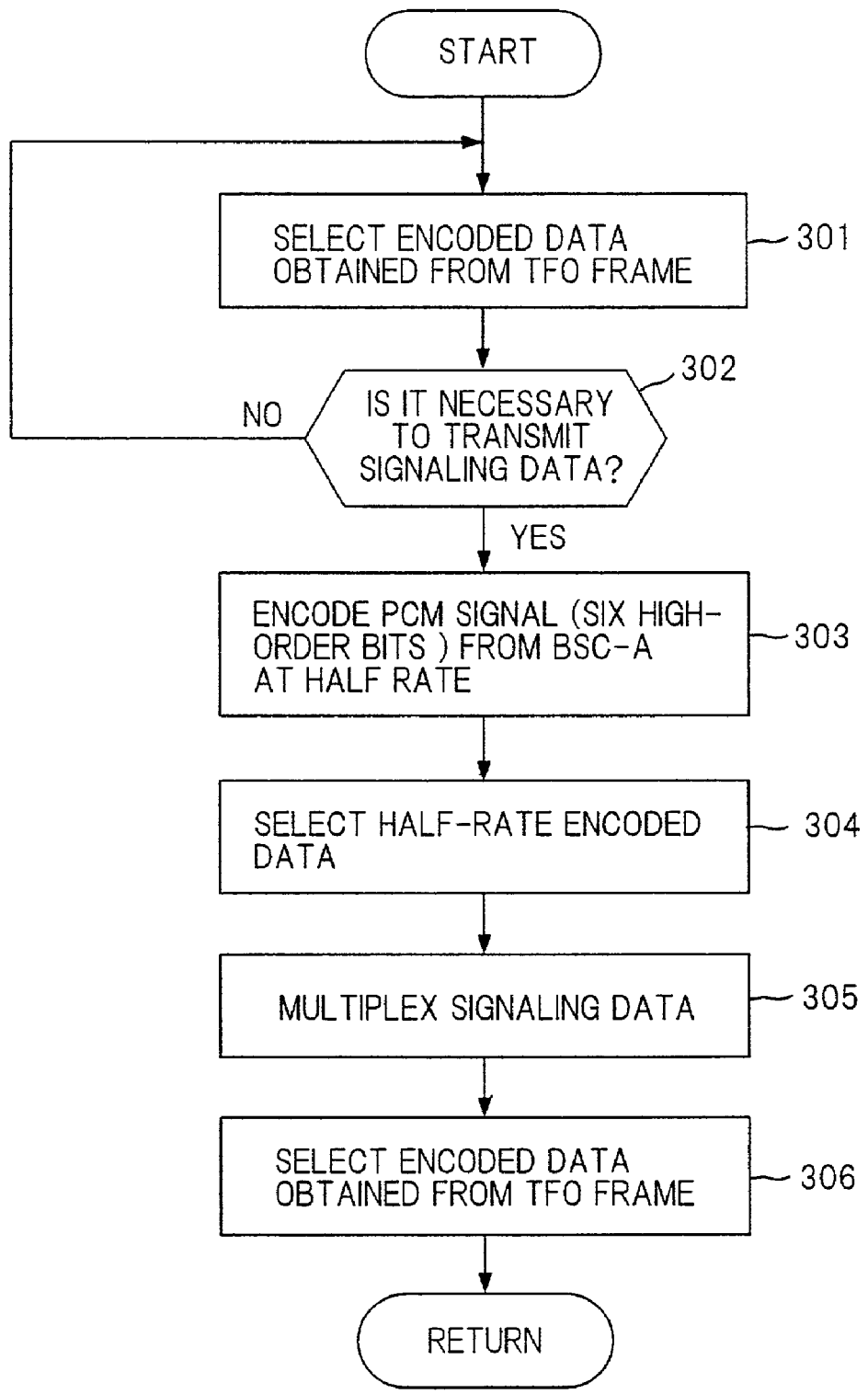
FIG. 10 is a flowchart of control processing according to the third embodiment.

FIG. 10 is a flowchart of control processing according to the third embodiment.

Compressed data that has been encoded by the vocoder of the mobile station MS-A is decoded by the decoder 22b of the base station controller BSC-A on the transmitting side so as to be restored to 8-bit PCM voice data. Concurrently, the compressed data that has been encoded by the vocoder of the mobile station MS-A is input to the TFO-frame assembling unit 23 as is so that TFO frame data is created. The multiplexer 26 always writes TFO frame data, which is output from the TFO-frame assembling unit 23, over the two low-order bits of the 8-bit PCM voice data decoded by the decoder 22b and transmits the resulting data to the base station controller BSC-B on the receiving side. In other words, the six high-order bits of the 8-bit PCM voice data represent voice data and the two low-order bits represent TFO frame data. On the other hand, the base station controller BSC-B on the receiving side receives data from the base station controller BSC-A on the transmitting side, full 8-bit encode processing is executed by the encoder 22a and the TFO frame disassembling unit 27 extracts the two low-order bits of the PCM data and extracts compressed voice data that has been bypassed. At the time of vocoder bypass, the selector 29 selects the compressed data output from the TFO frame disassembling unit 27 and sends this data to the mobile station MS-B via the base station transceiver subsystem BTS-B (step 301).

Next, it is determined whether it has become necessary to transmit signaling data (step 302). If transmission of signaling data is not necessary then the processing of step 301 is repeated.

If it becomes necessary for the base station controller BSC-B to transmit signaling data to the mobile station MS-B under these circumstances, the call controller 24 instructs the encoder 22a to perform half-rate encoding using the six high-order bits of the PCM data. In response, the encoder 22a performs half-rate encoding using the six high-order bits of the PCM voice data and the selector 29 selects and outputs the compressed data obtained from the encoder 22a (step 304). As a result of half-rate encoding, the half-rate space is created in a traffic frame. The signaling data multiplexer 30 therefore transmits the signaling data by multiplexing it into this space (step 305). Thenceforth, if transmission of all of the signaling data is completed, the call controller 24 controls the selector 29 in order to resume vocoder-bypass communication and causes it to select the compressed data output from the TFO frame disassembling unit 27 (the compressed data obtained from the TFO frame data) (step 306).

(D) Fourth Embodiment

Figure 11:
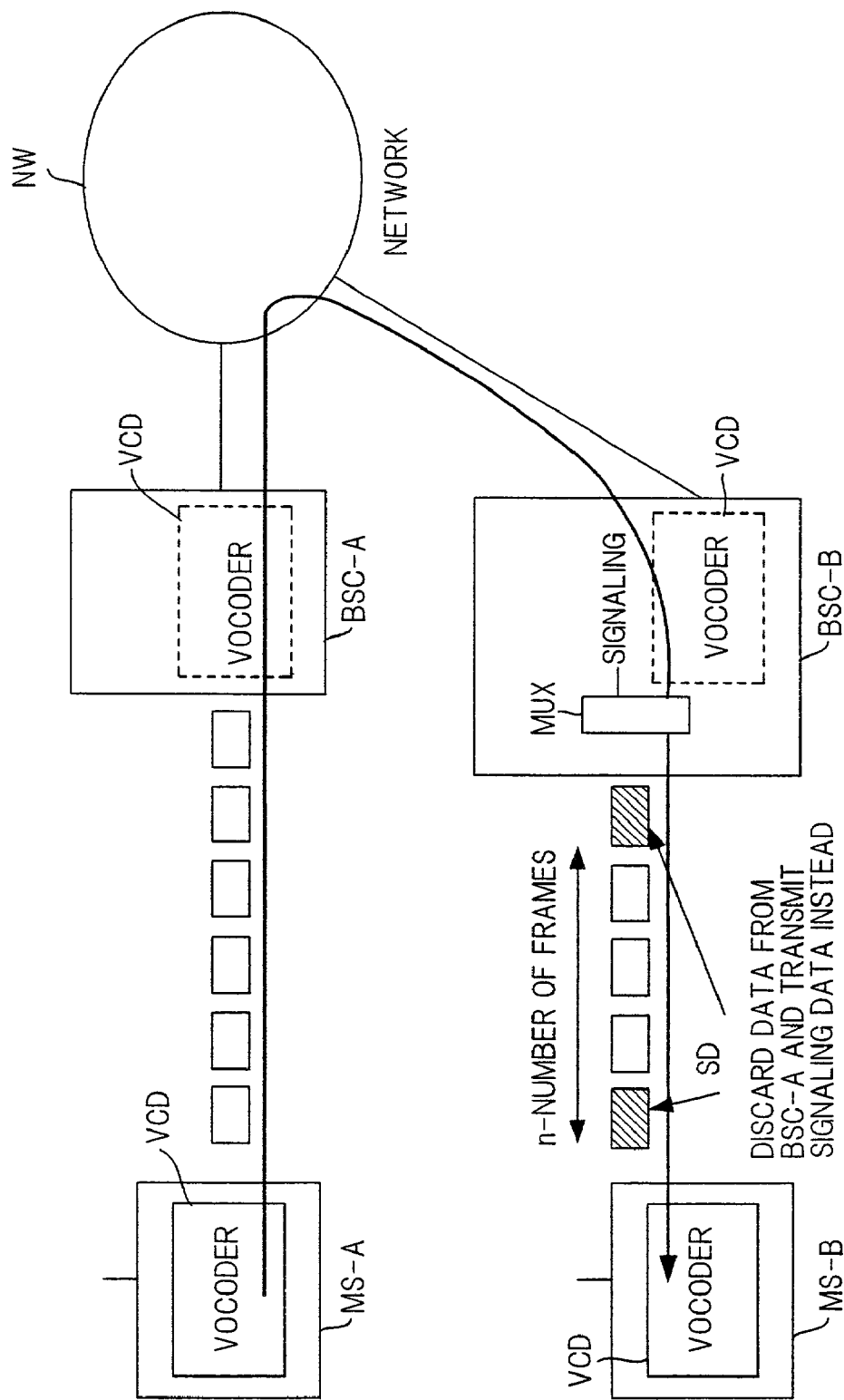
FIG. 11 is a diagram useful in describing an overview of a fourth embodiment of the present invention.

FIG. 11 is a diagram useful in describing an overview of a fourth embodiment of the present invention. Shown in FIG. 11 are communication network NW, such as a public switched telephone network, base station controllers BSC-A, BSC-B, mobile stations MS-A, MS-B, vocoders VCD provided in the mobile stations and base station controllers, and signaling multiplexer MUX for multiplexing signaling data onto voice data. The base station transceiver subsystems BTS-A, BTS-B are not shown.

The vocoder VCD of the mobile station MS-A on the voice transmitting side encodes voice data at a variable rate and transmits the encoded voice data to the base station controller BSC-A. The latter transmits the compressed data, which enters from the mobile station MS-A, to the base station controller BSC-B on the receiving side via the communication network NW while bypassing the vocoder.

If it becomes necessary to transmit signaling data from the base station controller BSC-B to the mobile station MS-B during such vocoder-bypass communication, the base station controller BSC-B discards compressed voice data, which has been received from the network, at fixed time intervals or at intervals of a fixed number of frames and instead puts signaling data SD into frame form and sends the signaling data to the mobile station.

Figure 12:
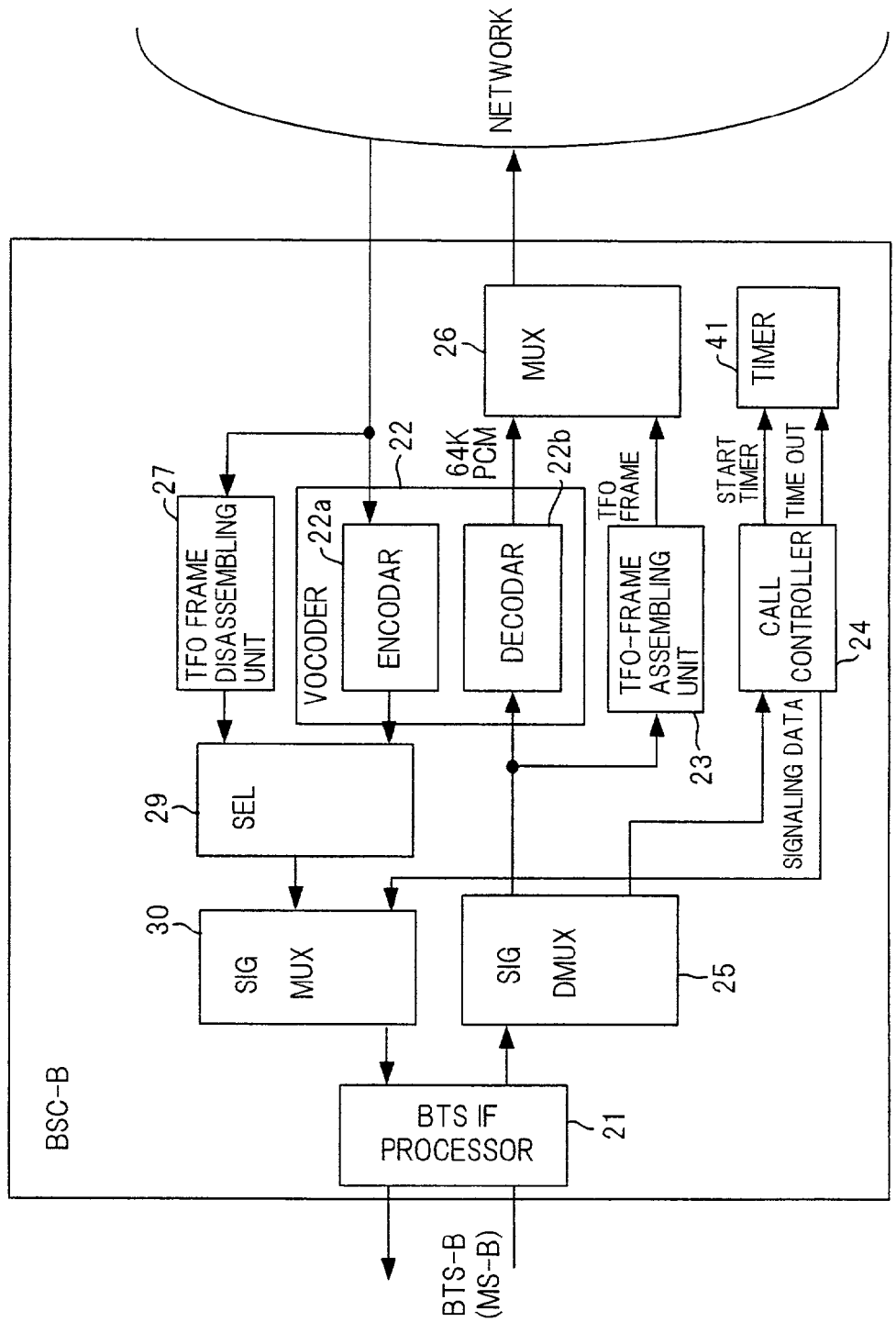
FIG. 12 is a diagram showing the structure of a base station controller according to the fourth embodiment.

FIG. 12 is a diagram showing the structure of the base station controller BSC-B according to the fourth embodiment, in which components identical with those of the first embodiment shown in FIG. 4 are designated by like reference characters. This embodiment differs in that (1) the rate identification unit 28 is eliminated and (2) a timer 41 for measuring a fixed period of time is provided.

Figure 13:
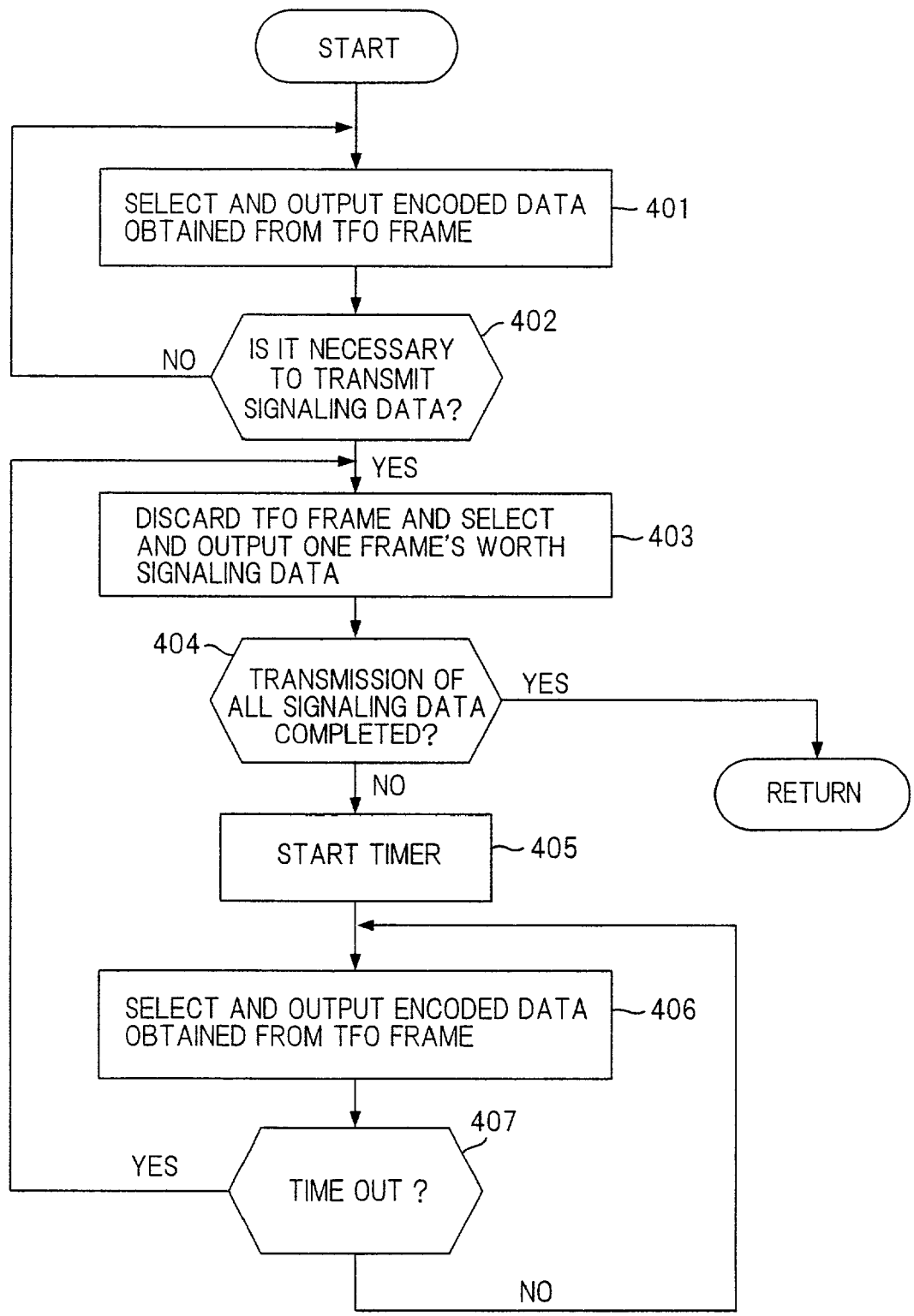
FIG. 13 is a flowchart of control processing according to the fourth embodiment.

FIG. 13 is a flowchart of processing according to the fourth embodiment.

Compressed data that has been encoded by the vocoder VCD of the mobile station MS-A bypasses the vocoder of the base station controller BSC-A on the transmitting side and is transmitted to the base station controller BSC-B on the receiving side. On the other hand, the base station controller BSC-B on the receiving side receives PCM data from the base station controller BSC-A on the transmitting side, full 8-bit encode processing is executed by the encoder 22a and the TFO frame disassembling unit 27 extracts the two low-order bits of the PCM data and extracts compressed voice data that has been bypassed.

At the time of vocoder-bypass communication, the selector 29 selects the compressed data output from the TFO frame disassembling unit 27 and sends this data to the mobile station MS-B via the base station transceiver subsystem BTS-B (step 401). Next, it is determined whether it has become necessary to transmit signaling data (step 402). If transmission of signaling data is not necessary, then the processing of step 401 is repeated.

If it becomes necessary for the base station controller BSC-B to transmit signaling data to the mobile station MS-B under these circumstances, the call controller 24 instructs the signaling data multiplexer 30 to select and output only one frame's worth of signaling data. As a result, the signaling data multiplexer 30 discards compressed data based upon one frame's worth of TFO frame data and sends one frame's worth of signaling data to the side of the mobile station (step 403). Next, it is determined whether the transmission of all signaling data has been completed (step 404). If the transmission of all signaling data has been completed, control returns to step 401 and processing from step onward is repeated.

If the transmission of all signaling data has not been completed, however, the timer 41 is started in order to monitor elapsed time (step 405), after which vocoder-bypass communication is resumed. The selector 29 selects the compressed data output from the TFO frame disassembling unit 27 and sends it to the mobile station MS-B via the base station transceiver subsystem BTS-B (step 406). Concurrently, it is determined whether the elapsed time has exceeded a set time (step 407). If the set time has not been exceeded, the processing of step 406 is repeated. If the set time has been exceeded, then the discard processing of step 403 is executed and the signaling data is transmitted. If the transmission of all signaling data is subsequently completed, then control returns to step 401.

(E) Fifth Embodiment

Figure 14:
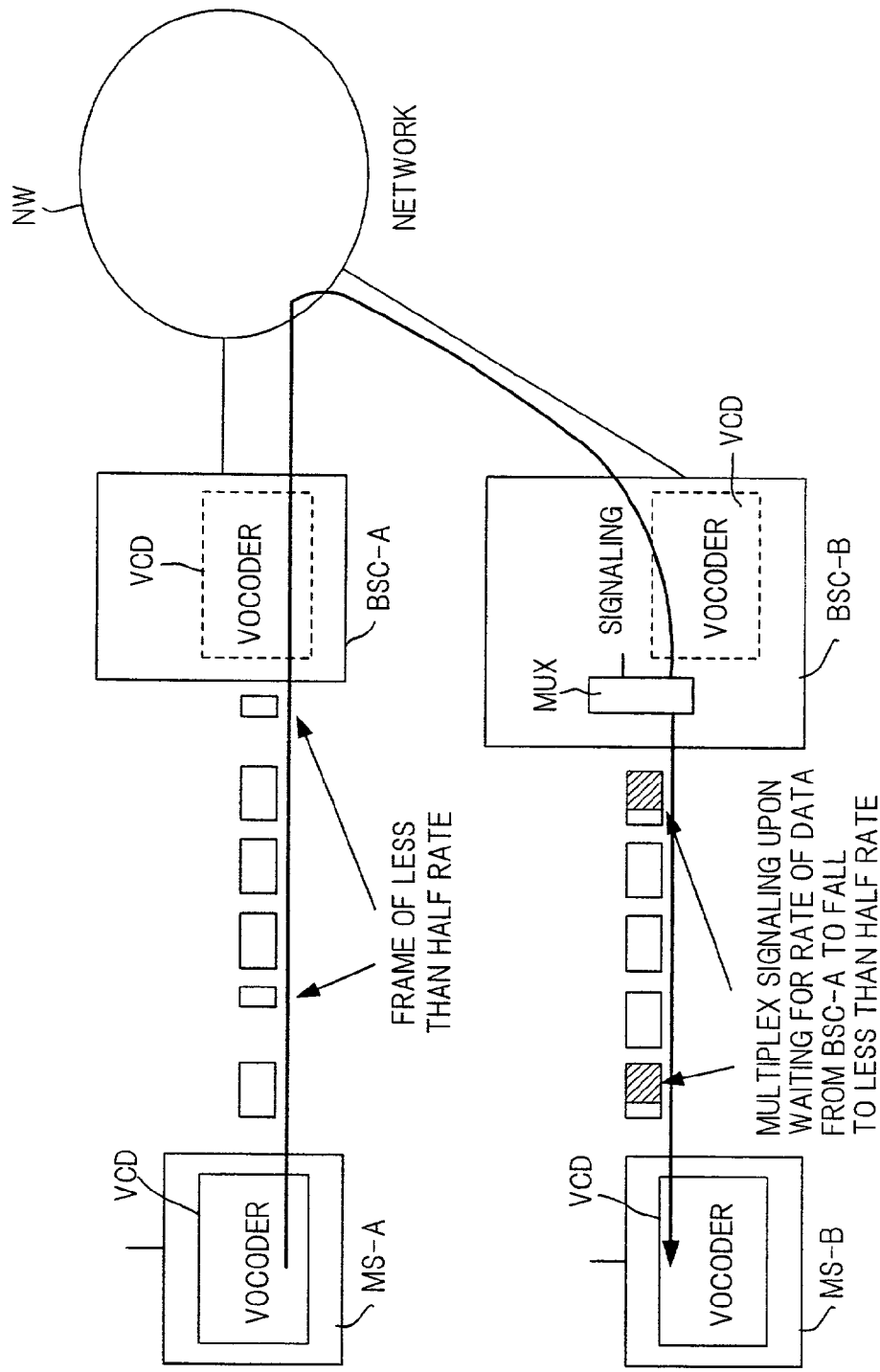
FIG. 14 is a diagram useful in describing an overview of a fifth embodiment of the present invention.

FIG. 14 is a diagram useful in describing an overview of a fifth embodiment of the present invention. Shown in FIG. 14 are communication network NW, such as a public switched telephone network, base station controllers BSC-A, BSC-B, mobile stations MS-A, MS-B, vocoders VCD provided in the mobile stations and base station controllers, and signaling multiplexer MUX for multiplexing signaling data onto voice data. The base station transceiver subsystems BTS-A, BTS-B are not shown.

At the time of vocoder-bypass communication, the vocoder VCD of the mobile station MS-A on the voice transmitting side encodes voice data at a variable rate and transmits the encoded voice data to the base station controller BSC-A. The latter transmits the compressed data, which enters from the mobile station MS-A, to the base station controller BSC-B on the receiving side via the communication network NW while bypassing the vocoder.

If it becomes necessary to transmit signaling data from the base station controller BSC-B to the mobile station MS-B during such vocoder-bypass communication, the base station controller BSC-B identifies the compression rate of the compressed voice data received from the network. If the compression rate is low (e.g., less than half the full rate), the base station controller BSC-B multiplexes the signaling data SD into a traffic frame that carries the voice data of the low compression rate and sends the multiplexed data to the mobile station MS-B.

Figure 15:
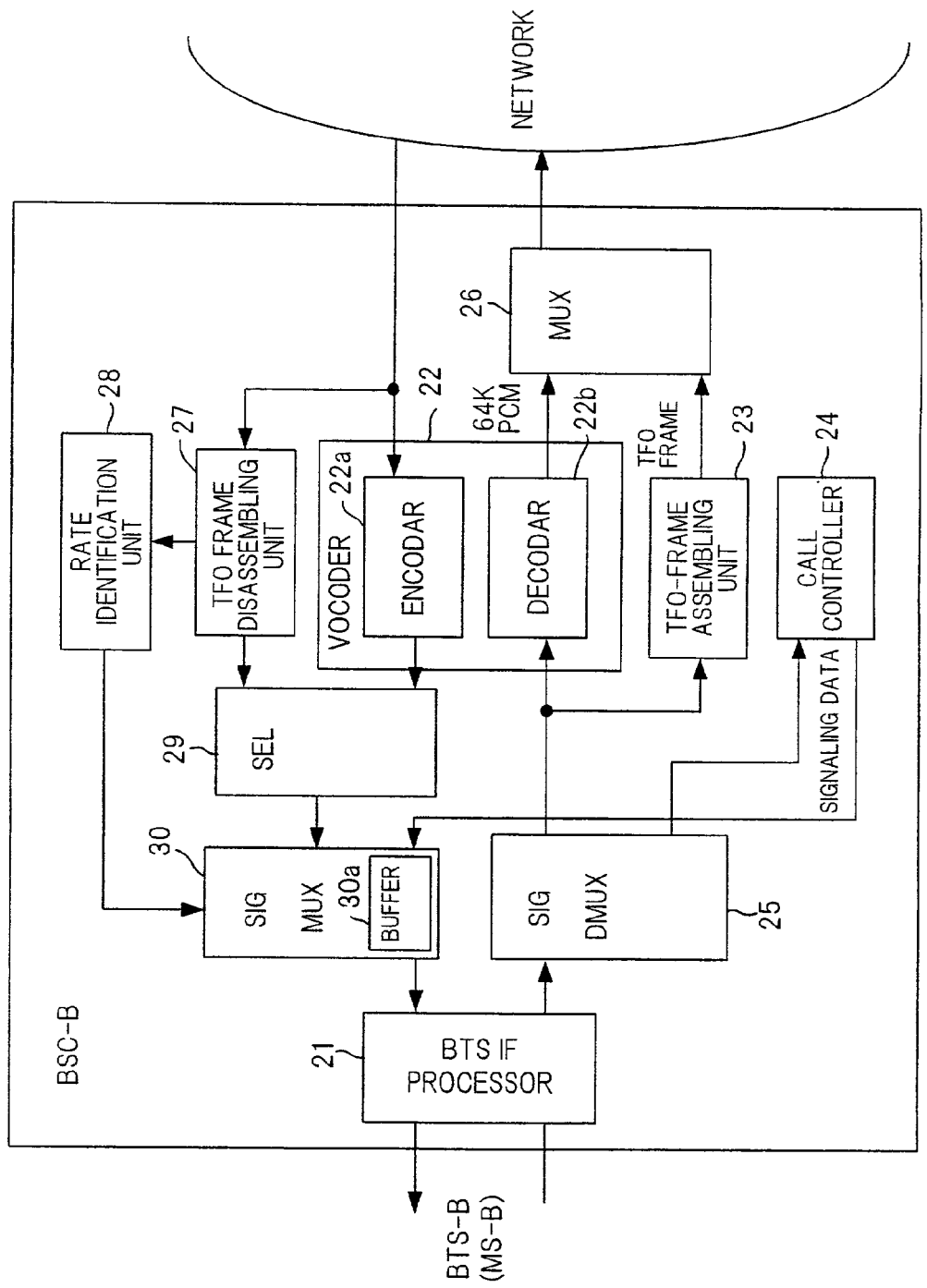
FIG. 15 is a diagram showing the structure of a base station controller according to the fifth embodiment.
Figure 16:
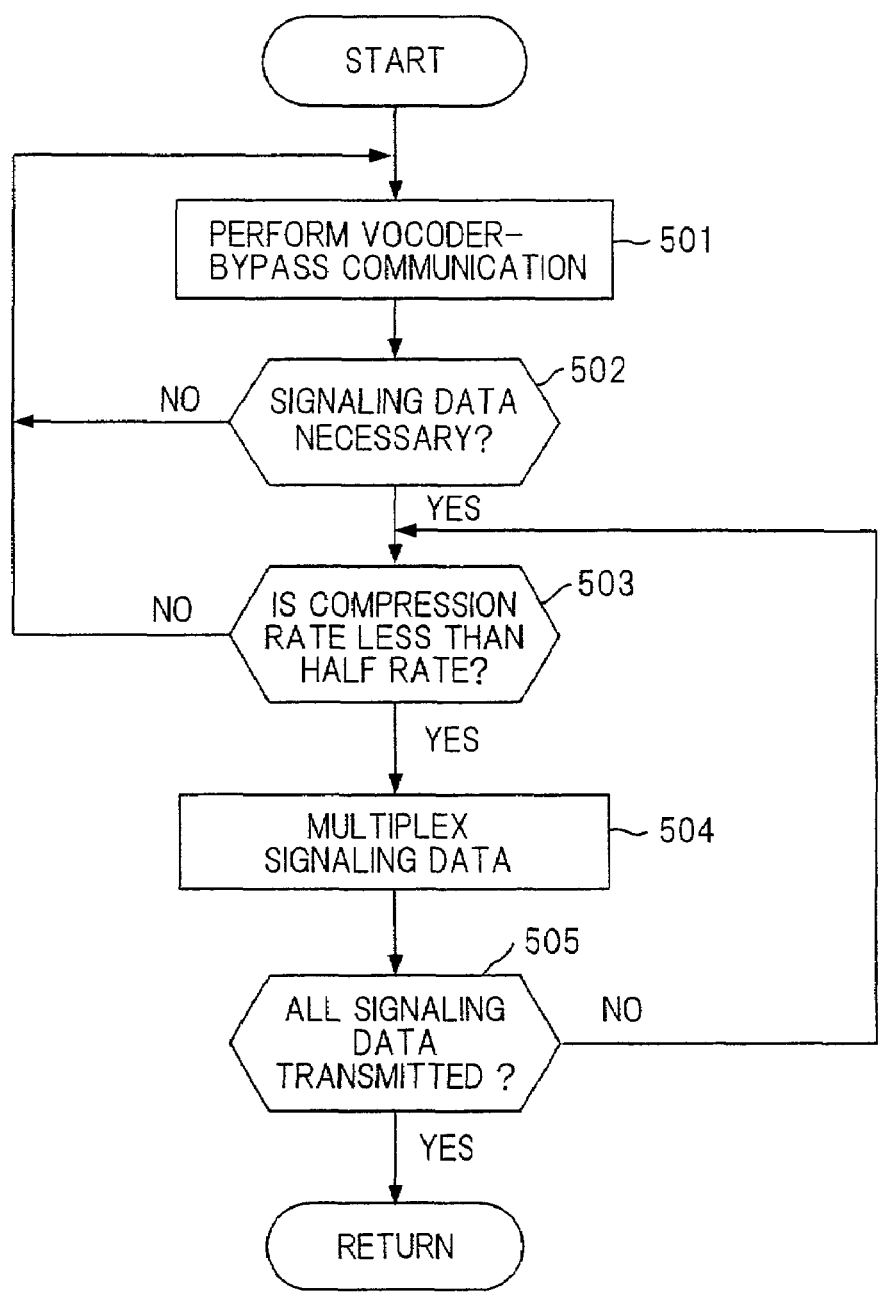
FIG. 16 is a flowchart of control processing according to the fifth embodiment.

FIG. 15 is a diagram showing the structure of the base station controller BSC-B according to the fifth embodiment, which has substantially the same structure as that of the first embodiment shown in FIG. 4. FIG. 16 is a flowchart of processing according to the fifth embodiment.

Compressed data that has been encoded by the vocoder VCD of the mobile station MS-A bypasses the vocoder of the base station controller BSC-A on the transmitting side and is transmitted to the base station controller BSC-B on the receiving side. The base station controller BSC-B on the receiving side receives PCM data from the base station controller BSC-A on the transmitting side and extracts bypassed compressed voice data from TFO frame data in the two low-order bits of the PCM data. At the time of vocoder-bypass communication, the selector 29 selects the compressed data output from the TFO frame disassembling unit 27 and sends this data to the mobile station MS-B via the base station transceiver subsystem BTS-B (step 501). Next, it is determined whether it has become necessary to transmit signaling data (step 502). If transmission of signaling data is not necessary, then the processing of step 501 is repeated.

If it becomes necessary for the base station controller BSC-B to transmit signaling data to the mobile station MS-B under these circumstances, the signaling data multiplexer 30 accumulates signaling data, which enters from the call controller 24, in a buffer 30a. Further, the rate identification unit 28 performs monitoring to determine whether the compression rate has fallen to less than half the full rate (step 503). If the compression rate has fallen to less than half the full rate, the rate identification unit 28 so notifies the signaling data multiplexer 30. If the compression rate has fallen to less than half the full rate, a vacant space is created in a traffic frame and therefore the signaling data multiplexer 30 transmits the signaling data to the mobile station by multiplexing the signaling data into this space (step 504). Next, it is determined whether transmission of all signaling data has been completed (step 505). If transmission of all signaling data has not been completed, then the processing from step 503 onward is repeated; if transmission has been completed, control returns to step 501.

(F) Sixth Embodiment

In the fifth embodiment, the fact that the compression rate has declined is detected and signaling data is transmitted upon being multiplexed into a vacant space of a frame. However, there are cases where the compression rate does not decline no matter how much time passes. In such cases there is a prolonged delay in the transmission of signaling data. The sixth embodiment prevents such a prolonged delay in the transmission of signaling data. Specifically, if signaling data remains despite elapse of a predetermined period of time, the signaling data is forcibly transmitted promptly in accordance with any of the second to fourth embodiments.

Figure 17:
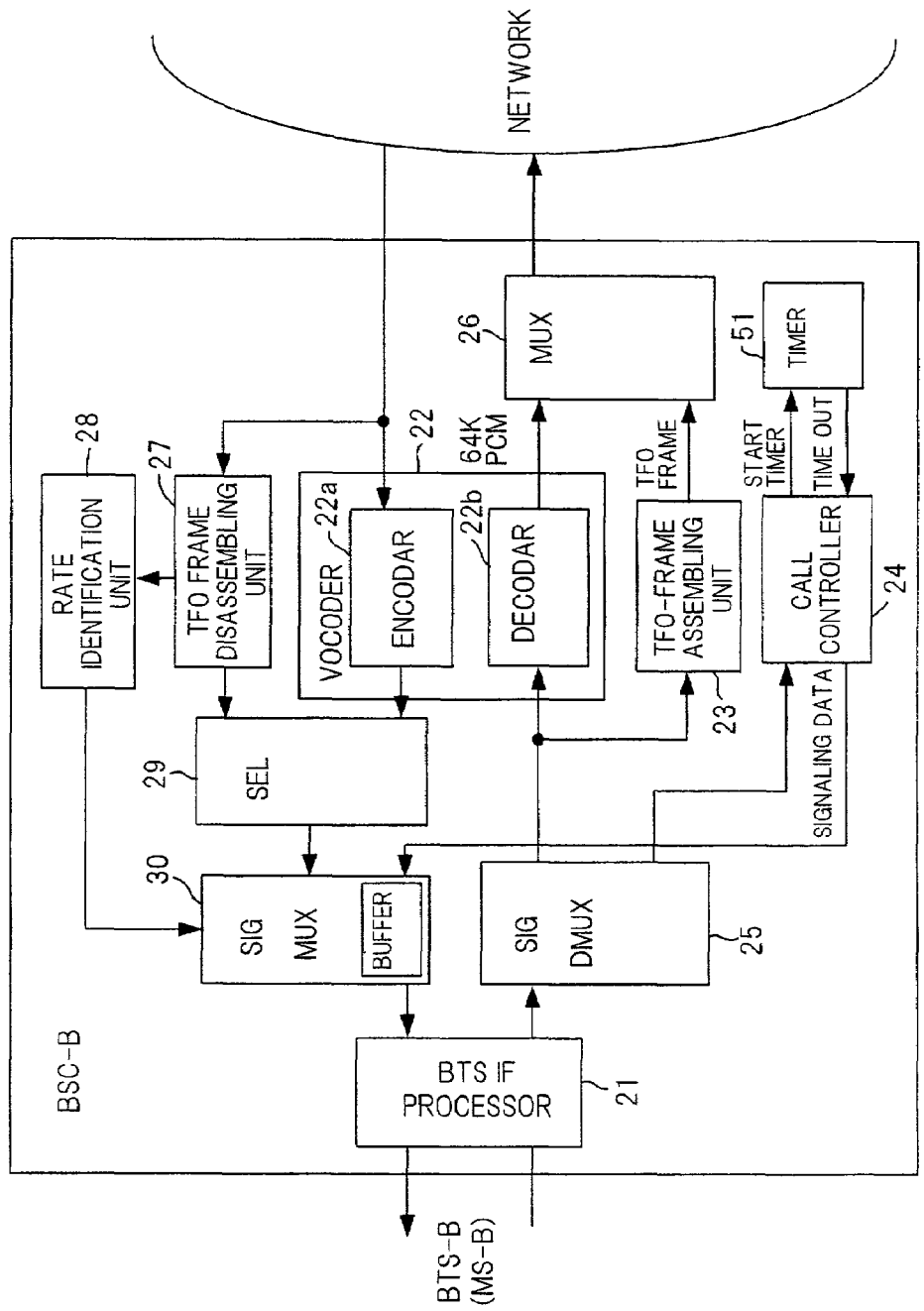
FIG. 17 is a diagram showing the structure of a base station controller according to the sixth embodiment.
Figure 18:
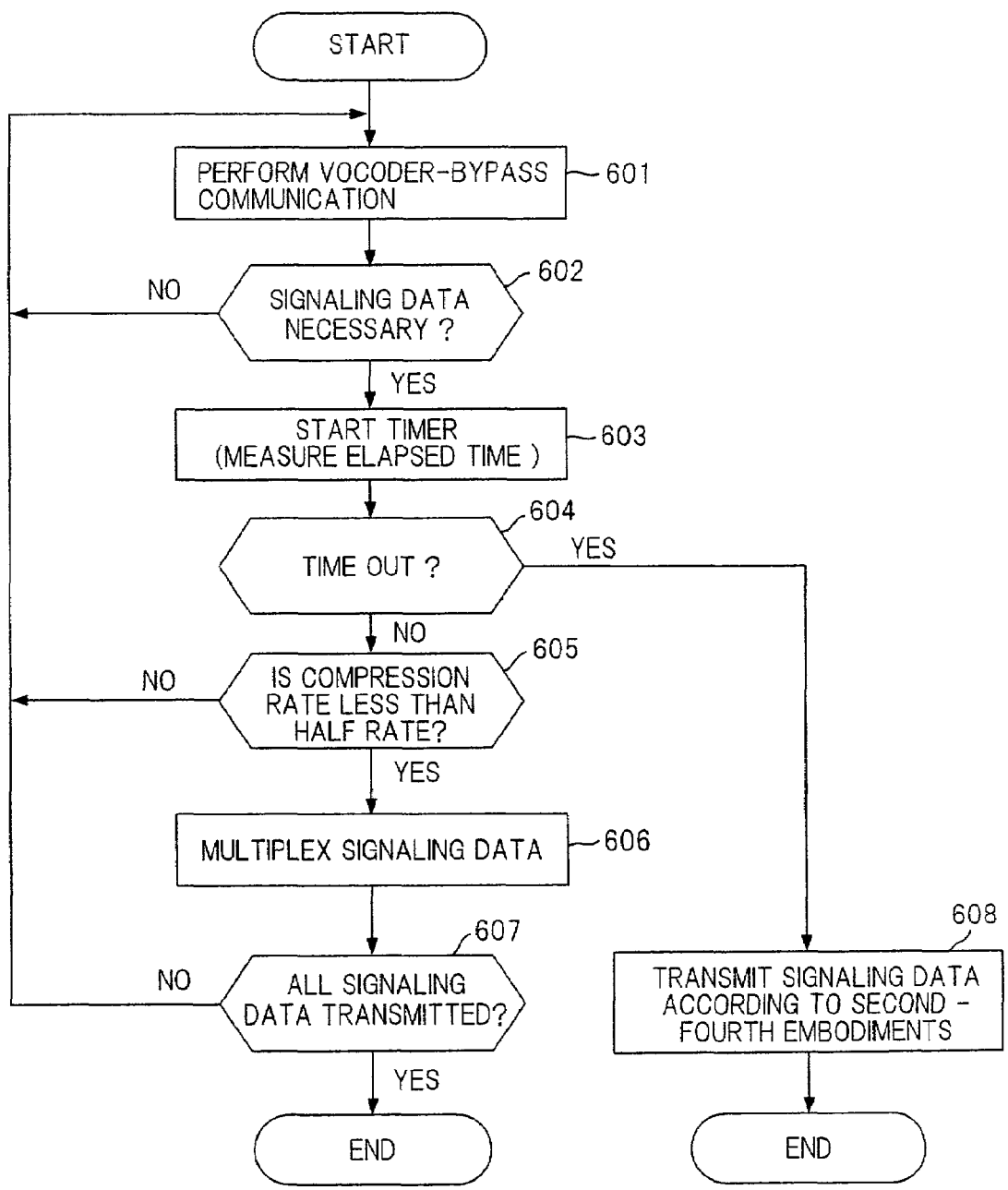
FIG. 18 is a flowchart of control processing according to the sixth embodiment.
Figure 19:
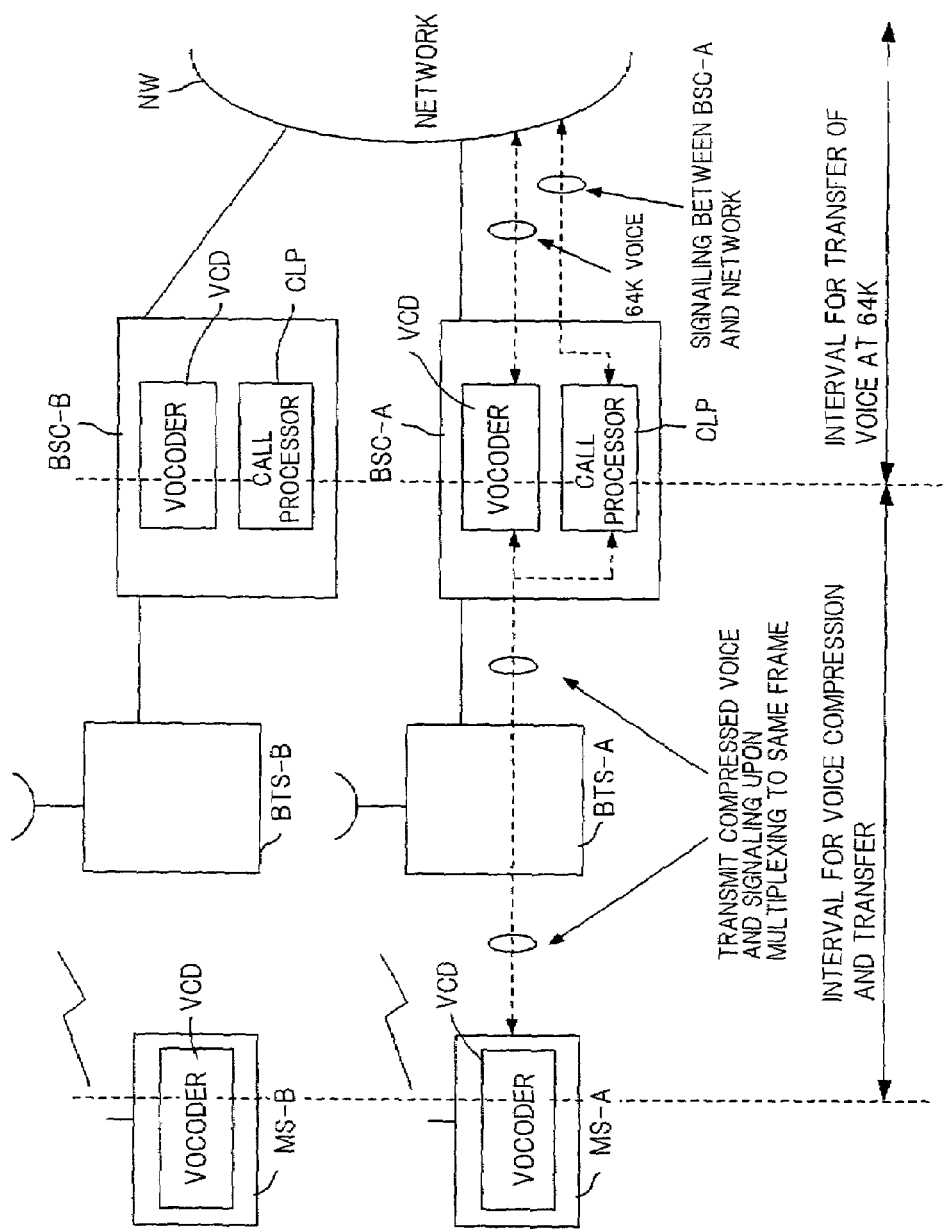
FIG. 19 is a block diagram illustrating the configuration of a mobile wireless communications system according to the prior art.
Figure 20:
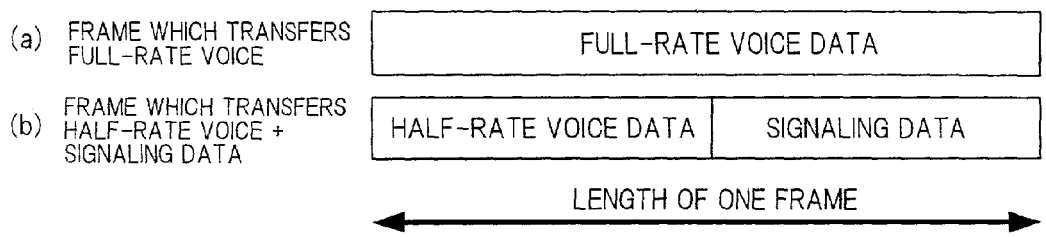
FIG. 20 shows an example of a frame transferred between a base station and a base station controller according to the prior art.
Figure 21:
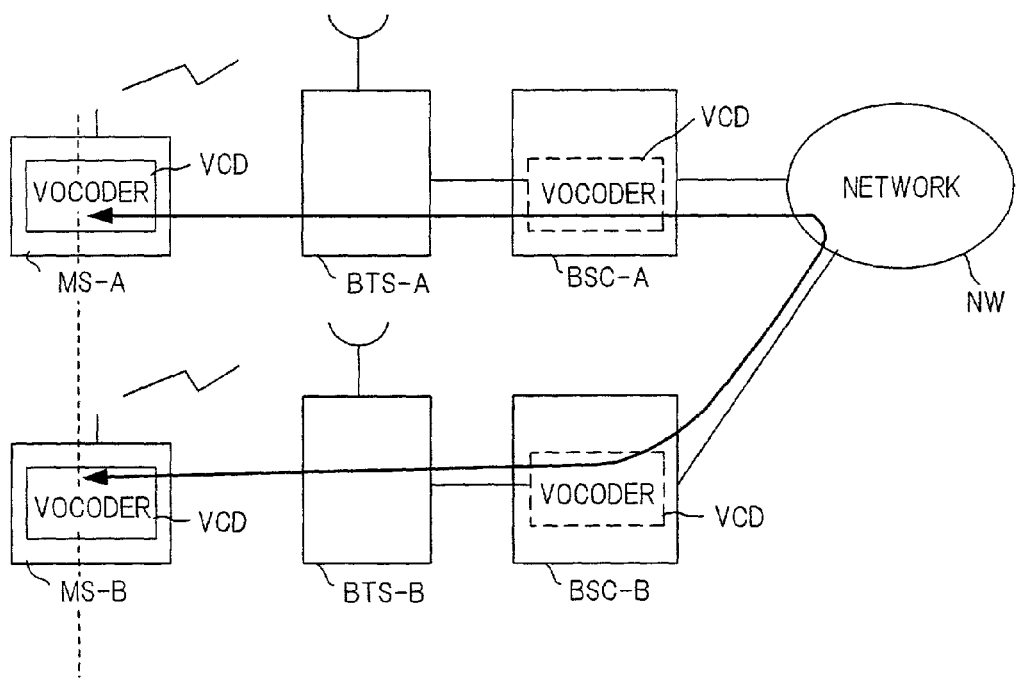
FIG. 21 is a diagram useful in describing vocoder-bypass communication according to the prior art.

FIG. 17 is a diagram showing the structure of the sixth embodiment, in which components identical with those of the fifth embodiment shown in FIG. 15 are designated by like reference characters. This embodiment differs in that a timer 51 is provided. FIG. 18 is a flowchart of processing according to the sixth embodiment.

Compressed data that has been encoded by the vocoder VCD of the mobile station MS-A bypasses the vocoder of the base station controller BSC-A on the transmitting side and is transmitted to the base station controller BSC-B on the receiving side. The base station controller BSC-B on the receiving side receives PCM data from the base station controller BSC-A on the transmitting side and extracts bypassed compressed voice data from TFO frame data in the two low-order bits of the PCM data. At the time of vocoder-bypass communication, the selector 29 of the base station controller BSC-B selects the compressed data output from the TFO frame disassembling unit 27 and sends this data to the mobile station MS-B via the base station transceiver subsystem BTS-B (step 601). Next, it is determined whether it has become necessary to transmit signaling data (step 602). If transmission of signaling data is not necessary, then the processing of step 601 is repeated.

If it becomes necessary for the base station controller BSC-B to transmit signaling data to the mobile station MS-B under these circumstances, the call controller 24 accumulates signaling data in the buffer 30a of the signaling data multiplexer 30. Further, the call controller 24 starts the timer 51 to start measurement of time (step 603). Next, it is determined whether the elapsed time has exceeded a set time (step 604). If the set time has not been exceeded, the rate identification unit 28 performs monitoring to determine whether the compression rate has fallen to less than half the full rate (step 605). If the compression rate has not fallen to less than half the full rate, then the processing from step 601 onward is executed. If the compression rate has fallen to less than half the full rate, however, then the rate identification unit 28 so notifies the signaling data multiplexer 30. If the compression rate has fallen to less than half the full rate, a vacant space is created in a traffic frame and therefore the signaling data multiplexer 30 transmits the signaling data to the mobile station MS-B by multiplexing the signaling data into this space (step 606). Next, it is determined whether transmission of all signaling data has been completed (step 607). If transmission of all signaling data has not been completed, then the processing from step 601 onward is repeated; if transmission has been completed, then processing for transmitting the signaling data is exited.

If the elapsed time exceeds the set time before all of the signaling data is transmitted, on the other hand, then a "YES" decision is rendered at step S604 and the signaling data is forcibly transmitted promptly in accordance with any of the second to fourth embodiments (step 608)

In accordance with the present invention, vocoder-bypass communication can be carried out when mobile stations converse with each other in mobile communication using a variable-rate codec. Further, signaling data can be transmitted even in vocoder-bypass communication. As a result, it is possible to improve voice quality by vocoder-bypass communication and, moreover, to transmit signaling data as at the time of handoff.

As many apparently widely different embodiments of the present invention can be made without departing from the spirit and scope thereof, it is to be understood that the invention is not limited to the specific embodiments thereof except as defined in the appended claims.

What is claimed is:

1. A signaling communication method in a mobile communications system for encoding voice data to compress the amount of data, putting the compressed data into frame form, sending and receiving the frame data, between a mobile station and a network device, and performing communication while bypassing a vocoder of the network device when mobile stations communicate with each other, said method comprising the steps of:

reducing the compression rate of voice data periodically or more than once for a predetermined period at a mobile station that is a source of voice-data transmission during vocoder-bypass communication;

detecting a reduction in compression rate of received voice data at a network device on the receiving side; and transmitting signaling data from said network device to another mobile station on another side of the network device upon multiplexing the signaling data into a traffic frame of the voice data whose compression rate has been reduced.

2. A mobile station in a mobile communications system for encoding voice data to compress the amount of data, putting the compressed data into frame form, sending and receiving the frame data between the mobile station and a network device, and performing communication while bypassing a vocoder of the network device when the mobile station communicates with another mobile station, said mobile station comprising:

a vocoder for encoding and outputting voice data at a variable compression rate, and for restoring input compressed data to voice data;

a compression rate controller for reducing the compression rate of said vocoder periodically; and a transceiver for transmitting encoded compressed data to the network device using a prescribed traffic frame, and for receiving a traffic frame, onto which compressed voice data and/or signaling data has been multiplexed, from the network device.

3. A network device in a mobile communications system for encoding voice data to compress the amount of data, putting the compressed data into frame form, sending and receiving the frame data between a mobile station and the network device, and performing communication while bypassing a vocoder of the network device when mobile stations communicate with each other, said network device comprising:

a vocoder for restoring compressed data, which enters from a mobile station, to PCM voice data and sending the PCM voice data to the side of a network, and for encoding PCM voice data, which enters from the network, and sending the encoded data to the side mobile station;

a TFO frame assembler for assembling a TFO frame using compressed data that enters from the mobile station;

a TFO frame disassembler for outputting compressed data obtained from a TFO frame that enters from the network;

means which, when vocoder-bypass communication is performed, is for sending the network the TFO frame assembled by said TFO frame assembler and sending a mobile station compressed data obtained by said TFO frame disassembler; and a rate identification unit for detecting compression rate of compressed data, which is contained in a received TFO frame, at the time of vocoder-bypass communication; and a signaling multiplexer, when said rate identification unit detects the compression rate is comparatively low, for multiplexing signaling data into a traffic frame that carries the compressed data and sending the multiplexed data to the side of a mobile station.

4. A signaling communication method in a mobile communications system for encoding voice data to compress the amount of data, putting the compressed data into frame form, sending and receiving the frame data between a mobile station and a network device, and performing communication while bypassing a vocoder of the network device when mobile stations communicate with each other, said method comprising the steps of:

instructing a network device on the transmitting side to halt vocoder-bypass communication and to instead transmit PCM voice data, which is output from a vocoder, when it becomes necessary to transmit signaling data from a network device on the receiving side to a mobile station on the receiving side during vocoder-bypass communication; and in the vocoder of the network device on the receiving side, encoding the PCM voice data, which has been received from the network device on the transmitting side, at a comparatively low compression rate and transmitting signaling data upon multiplexing the signaling data into a traffic frame that carries the compressed data obtained.

5. A network device in a mobile communications system for encoding voice data to compress the amount of data, putting the compressed data into frame form, sending and receiving the frame data between a mobile station and the network device, and performing communication while bypassing a vocoder of the network device when mobile stations communicate with each other, said network device comprising:

a vocoder for restoring compressed data, which enters from a mobile station, to PCM voice data and sending the PCM voice data to the side of a network, and for encoding PCM voice data, which enters from the network, at a variable compression rate and sending the encoded data to the side of a mobile station;

a TFO frame assembler for assembling a TFO frame using compressed data that enters from the mobile station;

a TFO frame disassembler for outputting compressed data obtained from a TFO frame that enters from the network;

multiplexing means for selecting the TFO frame assembled by said TFO frame assembler and sending the TFO frame to the network when vocoder-bypass communication is performed, and for selecting PCM voice data, which is output from a vocoder, and sending the PCM voice data to the network when non-vocoder-bypass communication is performed;

selecting means for selecting compressed data, which has been obtained by said TFO frame disassembler, and sending the compressed data to the side of the mobile station when vocoder-bypass communication is performed, and selecting compressed data, which is output from a vocoder, and sending the compressed data to the side of the mobile station when non-vocoder-bypass communication is performed;

means for commanding an opposing network device to halt vocoder-bypass communication and to instead transmit PCM voice data when it becomes necessary to transmit signaling data during vocoder-bypass communication;

means for controlling said multiplexing means to cause said multiplexing means to select and transmit full-rate PCM voice data, which is output from a vocoder, when said command is received from an opposing network device;

means for causing a vocoder to compress the PCM voice data, which has been transmitted from the opposing network device, at a comparatively low compression rate; and a signaling multiplexer for transmitting signaling data upon multiplexing the signaling data into a traffic frame that carries the compressed data obtained.

6. A signaling communication method in a mobile communications system for encoding voice data to compress the amount of data, putting the compresses data into frame form, sending and receiving the frame data between a mobile station and a network device, and performing communication while bypassing a vocoder of the network device when mobile stations communicate with each other, said method comprising the steps of:

restoring compressed data, which enters from a mobile station, to n-bit PCM voice data, assembling a TFO frame using this compressed data, and transmitting the TFO frame data to an opposing network device upon mapping the TFO frame data to prescribed low-order bits of the PCM voice data;

during vocoder-bypass communication, sending a mobile station compressed data obtained from TFO frame data that has been mapped to PCM voice data that enters from the network;

when it becomes necessary to transmit signaling data to a mobile station, encoding high-order bit of the PCM voice data, to which the TFO frame data has not been mapped, at a compression rate that is lower than a full rate; and transmitting signaling data upon multiplexing the signaling data into a traffic frame that carries the compressed data obtained.

7. A network device in a mobile communications system for encoding voice data to compress the amount of data, putting the compressed data into frame form, sending and receiving the frame data between a mobile station and the network device, and performing communication while bypassing a vocoder of the network device when mobile stations communicate with each other, said network device comprising:

a vocoder for restoring compressed data, which enters from a mobile station, to PCM voice data, and for encoding PCM voice data, which enters from the network, at a variable compression rate and outputting the encoded data;

a TFO frame assembler for assembling a TFO frame in order to map compressed data, which enters from the mobile station, to prescribed low-order bits of PCM voice data;

a multiplexer for mapping TFO frame data to low-order bits of full-bit PCM voice data, which is obtained from the vocoder, and sending the TFO frame data to the network;

a TFO frame disassembler for outputting compressed data obtained from TFO frame data mapped to PCM voice data that enters from the network;

a controller which, when it becomes necessary to transmit signaling data to a mobile station during vocoder-bypass communication, is for causing a vocoder to encode high-order bit data of the PCM voice data, to which the TFO frame data has not been mapped, at a compression rate that is lower than a full rate; and means for selecting compressed data, which is output from said TFO frame disassembler, when vocoder-bypass communication is performed, selecting compressed data, which is output from a vocoder, when signaling data is transmitted, and transmitting signaling data upon multiplexing the signaling data into a traffic frame that carries the compressed data selected.

8. A signaling communication method in a mobile communications system for encoding voice data to compress the amount of data, putting the compressed data into frame form, sending and receiving the frame data between a mobile station and a network device, and performing communication while bypassing a vocoder of the network device when mobile stations communicate with each other, said method comprising the steps of:

discarding compressed voice data, which has been received from a network, at fixed intervals when it becomes necessary to transmit signaling data from a network device to a mobile station during vocoder-bypass communication; and putting signaling data into frame form and sending this data instead to the mobile station.

9. A network device in a mobile communications system for encoding voice data to compress the amount of data, putting the compressed data into frame form, sending and receiving the frame data between a mobile station and the network device, and performing communication while bypassing a vocoder of the network device when mobile stations communicate with each other, said network device comprising:

a vocoder for restoring compressed data, which enters from a mobile station, to PCM voice data and sending the PCM voice data to the side of a network, and for encoding PCM voice data, which enters from the network, and sending the encoded data to the side of a mobile station;

a TFO frame assembler for assembling a TFO frame using compressed data that enters from the mobile station;

a TFO frame disassembler for outputting compressed voice data obtained by disassembling a TFO frame that enters from the network;

means which, when vocoder-bypass communication is performed, is for selecting and sending the network the TFO frame assembled by said TFO frame assembler and selecting and sending a mobile station compressed voice data obtained by said TFO frame disassembler; and a controller which, when it becomes necessary to transmit signaling data to a mobile station during vocoder-bypass communication, is for discarding compressed voice data to the mobile station at fixed intervals and putting signaling data into frame form and sending this data instead to the mobile station.

10. A signaling communication method in a mobile communications system for encoding voice data to compress the amount of data, putting the compressed data into frame form, sending and receiving the frame data between a mobile station and a network device, and performing communication while bypassing a vocoder of the network device when mobile stations communicate with each other, said method comprising the steps of:

identifying compression rate of compressed voice data, which has been received from a network, when it becomes necessary to transmit signaling data from a network device to a mobile station during vocoder-bypass communication; and when the compression rate is comparatively low, transmitting signaling data upon multiplexing the signaling data into a traffic frame that carries the compressed data.

11. The method according to claim 10, wherein if transmission of signaling data cannot be performed continuously in excess of a fixed period of time, vocoder-bypass communication is halted and PCM voice data is received instead from a network device on the transmitting side, the PCM voice data is encoded at a comparatively low compression rate in a vocoder of a network device on the receiving side, and signaling data is transmitted to the side of a mobile station upon being multiplexed into a traffic frame that carries the compressed data obtained.

12. The method according to claim 10, wherein if transmission of signaling data cannot be performed continuously in excess of a fixed period of time, high-order bit data of the PCM voice data not used in the TFO frame received from the network is encoded at a compression rate that is lower than a full rate, and signaling data is transmitted upon being multiplexed into a traffic frame that carries the compressed data obtained.

13. The method according to claim 10, wherein if transmission of signaling data cannot be performed continuously in excess of a fixed period of time, compressed voice data received from the network is discarded at fixed intervals and signaling data is put into frame form and sent to the mobile station instead.

14. A network device in a mobile communications system for encoding voice data to compress the amount of data, putting the compressed data into frame form, sending and receiving the frame data between a mobile station and the network device, and performing communication while bypassing a vocoder of the network device when mobile stations communicate with each other, said network device comprising:

a vocoder for restoring compressed data, which enters from a mobile station, to PCM voice data and sending the PCM voice data to the side of a network, and for encoding PCM voice data, which enters from the network, and sending the encoded data to the side of a mobile station;

a TFO frame assembler for assembling a TFO frame using compressed data that enters from the mobile station;

a TFO frame disassembler for outputting compressed voice data obtained from a TFO frame that enters from the network;

means which, when vocoder-bypass communication is performed, is for selecting and sending the network the TFO frame assembled by said TFO frame assembler and selecting and sending a mobile station compressed voice data obtained by said TFO frame disassembler; and a controller which, when it becomes necessary to transmit signaling data to a mobile station during vocoder-bypass communication and, moreover, the compression rate of compressed voice data received from the network is comparatively low, is for transmitting signaling data to a mobile station upon multiplexing the signaling data into a traffic frame that carries the compressed voice data.

* * * * *